United States Patent
Tanaka

(10) Patent No.: US 12,024,248 B2
(45) Date of Patent: Jul. 2, 2024

(54) VEHICLE STEERING DEVICE

(71) Applicant: NSK LTD., Tokyo (JP)

(72) Inventor: Keitarou Tanaka, Kanagawa (JP)

(73) Assignee: NSK LTD., Tokyo (JP)

( * ) Notice: Subject to any disclaimer, the term of this patent is extended or adjusted under 35 U.S.C. 154(b) by 294 days.

(21) Appl. No.: 17/621,765

(22) PCT Filed: Feb. 5, 2021

(86) PCT No.: PCT/JP2021/004436
§ 371 (c)(1),
(2) Date: Dec. 22, 2021

(87) PCT Pub. No.: WO2021/157727
PCT Pub. Date: Aug. 12, 2021

(65) Prior Publication Data
US 2022/0355856 A1    Nov. 10, 2022

(30) Foreign Application Priority Data

Feb. 7, 2020    (JP) ................................ 2020-019440

(51) Int. Cl.
*B62D 5/04*    (2006.01)
*B60W 10/20*    (2006.01)
(Continued)

(52) U.S. Cl.
CPC ......... *B62D 6/008* (2013.01); *B62D 15/0215* (2013.01)

(58) Field of Classification Search
None
See application file for complete search history.

(56) References Cited

U.S. PATENT DOCUMENTS 6,625,530 B1    9/2003  Bolourchi
6,751,539 B2    6/2004  Uenuma et al.
(Continued)

FOREIGN PATENT DOCUMENTS

JP    2003-081111 A    3/2003
JP    2005-335587 A    12/2005
(Continued)

OTHER PUBLICATIONS

International Search Report for PCT/JP2021/004436 dated Apr. 27, 2021.
Written Opinion for PCT/JP2021/004436 dated Apr. 27, 2021.

*Primary Examiner* — Jonathan M Dager
*Assistant Examiner* — Laura E Linhardt
(74) *Attorney, Agent, or Firm* — Sughrue Mion, PLLC

(57) ABSTRACT

A vehicle steering device includes a target steering torque generation unit configured to generate target steering torque for a reaction force motor, and a torque correction value calculation unit configured to generate a torque signal Tref_p in accordance with road surface reaction force acting on a steering wheel of a vehicle. The torque correction value calculation unit generates the torque signal Tref_p by separating estimated road surface reaction force into a low-frequency component and a high-frequency component, providing level restriction on each of the low-frequency component and the high-frequency component, and adding torque values converted from the low-frequency component and the high-frequency component after the level restriction. The target steering torque generation unit generates the target steering torque by adding the torque signal Tref_p and a torque signal Tref_a generated based on a predetermined basic map in accordance with at least a vehicle speed and a steering angle of the vehicle.

3 Claims, 17 Drawing Sheets

(51) Int. Cl.
    *B60W 10/22*     (2006.01)
    *B60W 30/02*     (2012.01)
    *B62D 6/00*     (2006.01)
    *B62D 15/02*     (2006.01)

(56) References Cited

U.S. PATENT DOCUMENTS

| | | |
|---|---|---|
| 7,246,679 B2 | 7/2007 | Kasahara et al. |
| 2019/0359203 A1* | 11/2019 | Isshiki .................. B60W 30/02 |
| 2022/0063710 A1* | 3/2022 | Tsubaki ............... B62D 5/0421 |

FOREIGN PATENT DOCUMENTS

| | | | |
|---|---|---|---|
| JP | 2007-153249 A | 6/2007 | |
| JP | 4586551 B2 | 11/2010 | |

* cited by examiner

VEHICLE STEERING DEVICE

CROSS REFERENCE TO RELATED APPLICATIONS

This application is a National Stage of International Application No. PCT/JP2021/004436 filed Feb. 5, 2021, claiming priority based on Japanese Patent Application No. 2020-019440 filed Feb. 7, 2020.

FIELD

The present invention relates to a vehicle steering device.

BACKGROUND

As a vehicle steering device, there is a steer-by-wire (SBW) vehicle steering device having mechanical separation between a steering reaction force generation device (force feedback actuator (FFA): steering mechanism) through which a driver performs steering and a tire turning device (road wheel actuator (RWA): turning mechanism) that turns the vehicle. Such an SBW vehicle steering device has a configuration in which the steering mechanism and the turning mechanism are electrically connected with each other through a control unit (electronic control unit (ECU)), and control between the steering mechanism and the turning mechanism is performed by an electric signal.

In such an SBW vehicle steering device, road surface reaction force acting on turning wheels needs to be detected or estimated and to be reflected in steering reaction force, but excessive road surface reaction force acting on the turning wheels when a vehicle passes through a rough road may interfere with a wheel operation by the driver in some cases. Thus, a technology of setting the steering reaction force to be a constant value when road surface reaction force exceeding a predetermined threshold value is detected has been disclosed (for example, Patent Literature 1).

CITATION LIST

Patent Literature

Patent Literature 1: Japanese Patent No. 4586551

SUMMARY

Technical Problem

Characteristics of road surface reaction force differ depending on the situation of a road surface. Specifically, for example, frequency components of road surface reaction force received by turning wheels differ between a case of a largely undulating road surface and a case of traveling on a road surface of an unpaved road. In the above-described conventional technology, only whether the absolute value of road surface reaction force exceeds a threshold value is detected irrespective of characteristics of the road surface reaction force and steering reaction force is set to be a constant value for excessive road surface reaction force, and thus a road surface situation that essentially needs to be transferred to a driver through a wheel may fail to be reflected in the steering reaction force.

The present invention is made in view of the above-described problem and is intended to provide a vehicle steering device capable of appropriately reflecting road surface reaction force in steering reaction force in accordance with characteristics of road surface reaction force.

Solution to Problem

In order to achieve the above object, a vehicle steering device according to an embodiment of the present invention comprising: a reaction force motor configured to apply steering reaction force to a wheel; a turning motor configured to turn a tire in accordance with steering of the wheel; and a control unit configured to control the reaction force motor and the turning motor, wherein the control unit includes a target steering torque generation unit configured to generate a first torque signal based on a predetermined basic map in accordance with at least a vehicle speed and a steering angle of a vehicle and generate target steering torque for the reaction force motor, and a torque correction value calculation unit configured to generate a second torque signal in accordance with road surface reaction force acting on a steering wheel of the vehicle, the torque correction value calculation unit generates the second torque signal by separating estimated road surface reaction force into a low-frequency component and a high-frequency component, providing level restriction on each of the low-frequency component and the high-frequency component, and adding torque values converted from the low-frequency component and the high-frequency component after the level restriction, and the target steering torque generation unit generates the target steering torque by adding at least the first torque signal and the second torque signal.

With the above-described configuration, it is possible to obtain the second torque signal with which the low-frequency and high-frequency components of road surface reaction force are each appropriately level-restricted. Accordingly, it is possible to obtain appropriate steering reaction force in accordance with characteristics of the road surface reaction force without degrading the following capability of the target steering torque for the road surface reaction force.

As a desirable embodiment of the vehicle steering device, it is preferable that the torque correction value calculation unit includes a road surface reaction force estimation unit configured to calculate the estimated road surface reaction force based on a current value of the turning motor and a turning angle of the steering wheel, a band restriction unit configured to bifurcate the estimated road surface reaction force into first band-restricted road surface reaction force and second band-restricted road surface reaction force restricted to respective different frequency bands, a level restriction unit configured to provide level restriction on each of the first band-restricted road surface reaction force and the second band-restricted road surface reaction force by an upper limit value and a lower limit value, and a correction torque generation unit configured to generate the second torque signal by multiplying each of first level-restricted road surface reaction force and second level-restricted road surface reaction force by a predetermined gain and adding the multiplied first level-restricted road surface reaction force and the multiplied second level-restricted road surface reaction force, the first level-restricted road surface reaction force being obtained through level restriction on the first band-restricted road surface reaction force, the second level-restricted road surface reaction force being obtained through level restriction on the second band-restricted road surface reaction force.

With the above-described configuration, it is possible to appropriately provide level restriction on each of the low-frequency and high-frequency components of road surface reaction force. In addition, it is possible to obtain the second torque signal as a correction value for obtaining a target steering torque Tref in accordance with the road surface reaction force.

As a desirable embodiment of the vehicle steering device, it is preferable that the band restriction unit includes a first filter and a second filter having respective different passbands, the first filter is a low-pass filter having a passband equal to a first frequency band including the low-frequency component of the estimated road surface reaction force, and outputs the low-frequency component of the road surface reaction force as the first band-restricted road surface reaction force, and the second filter is a high-pass filter having a passband equal to a second frequency band including the high-frequency component of the estimated road surface reaction force, and outputs the high-frequency component of the road surface reaction force as the second band-restricted road surface reaction force.

Accordingly, it is possible to set cutoff frequencies of the first and second filters as appropriate in accordance with characteristics of road surface reaction force.

Advantageous Effects of Invention

According to the present invention, it is possible to provide a vehicle steering device capable of appropriately reflecting road surface reaction force in steering reaction force in accordance with characteristics of road surface reaction force.

DESCRIPTION OF EMBODIMENTS

Modes for carrying out the invention (hereinafter referred to as an embodiment) will be described below in detail with reference to the accompanying drawings. Note that, the present invention is not limited by the following embodiment. In addition, components in the embodiment described below include their equivalents such as those that could be easily thought of by the skilled person in the art and those identical in effect. Moreover, components disclosed in the embodiment described below may be combined as appropriate.

Figure 1:
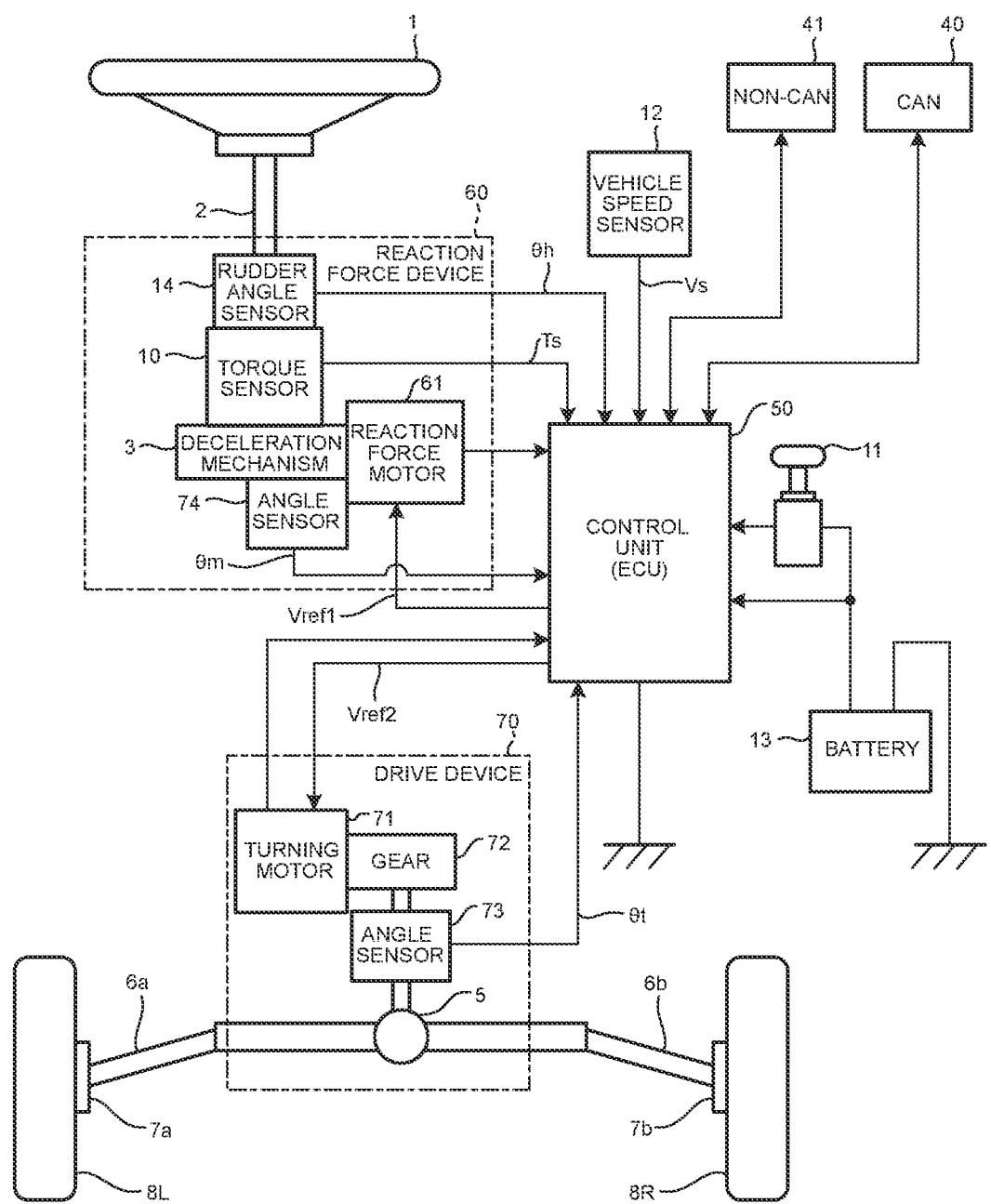
FIG. 1 is a diagram illustrating the entire configuration of a steer-by-wire vehicle steering device.

FIG. 1 is a diagram illustrating the entire configuration of a steer-by-wire vehicle steering device. The steer-by-wire (SBW) vehicle steering device (hereinafter also referred to as an "SBW system") illustrated in FIG. 1 is a system configured to convey, through an electric signal, an operation of a wheel 1 to a turning mechanism including steering wheels 8L and 8R. As illustrated in FIG. 1, the SBW system includes a reaction force device 60 and a drive device 70, and a control unit (ECU) 50 controls the devices.

The reaction force device 60 includes a torque sensor 10 configured to detect steering torque Ts of the wheel 1, a rudder angle sensor 14 configured to detect a steering angle θh, a deceleration mechanism 3, an angle sensor 74, a reaction force motor 61, and the like. These components are provided on a column shaft 2 of the wheel 1.

The reaction force device 60 performs detection of the steering angle θh at the rudder angle sensor 14 and simultaneously transfers, to a driver as reaction force torque, a motion state of a vehicle conveyed from the steering wheels 8L and 8R. The reaction force torque is generated by the reaction force motor 61. The torque sensor 10 detects the steering torque Ts. In addition, the angle sensor 74 detects a motor angle θm of the reaction force motor 61.

The drive device 70 includes a turning motor 71, a gear 72, an angle sensor 73, and the like. Drive power generated by the turning motor 71 is coupled with the steering wheels 8L and 8R through the gear 72, a pinion rack mechanism 5, and tie rods 6a and 6b and further through hub units 7a and 7b.

The drive device 70 drives the turning motor 71 in accordance with steering of the wheel 1 by the driver, applies the drive power thereof to the pinion rack mechanism 5 through the gear 72, and turns the steering wheels 8L and 8R through the tie rods 6a and 6b. The angle sensor 73 is disposed near the pinion rack mechanism 5 and detects a turning angle $\theta t$ of the steering wheels 8L and 8R. For cooperative control of the reaction force device 60 and the drive device 70, the ECU 50 generates a voltage control command value Vref1 with which the reaction force motor 61 is driven and controlled and a voltage control command value Vref2 with which the turning motor 71 is driven and controlled, based on, for example, a vehicle speed Vs from a vehicle speed sensor 12 in addition to information such as the steering angle $\theta h$ and the turning angle $\theta t$ output from the devices.

The angle sensor 73 may detect the angle of the turning motor 71 instead of the turning angle $\theta t$. In this case, a value detected by the angle sensor 73 may be converted into the turning angle $\theta t$ and used for control at a later stage.

Electric power is supplied from a battery 13 to the control unit (ECU) 50, and an ignition key signal is input to the control unit 50 through an ignition key 11. The control unit 50 performs calculation of a current command value based on, for example, the steering torque Ts detected by the torque sensor 10 and the vehicle speed Vs detected by the vehicle speed sensor 12, and controls current supplied to the reaction force motor 61 and the turning motor 71.

The control unit 50 is connected with an on-board network such as a controller area network (CAN) 40 through which various kinds of information of a vehicle are transmitted and received. In addition, the control unit 50 is connectable with a non-CAN 41 configured to transmit and receive communication other than the CAN 40, analog and digital signals, radio wave, and the like.

Figure 2:
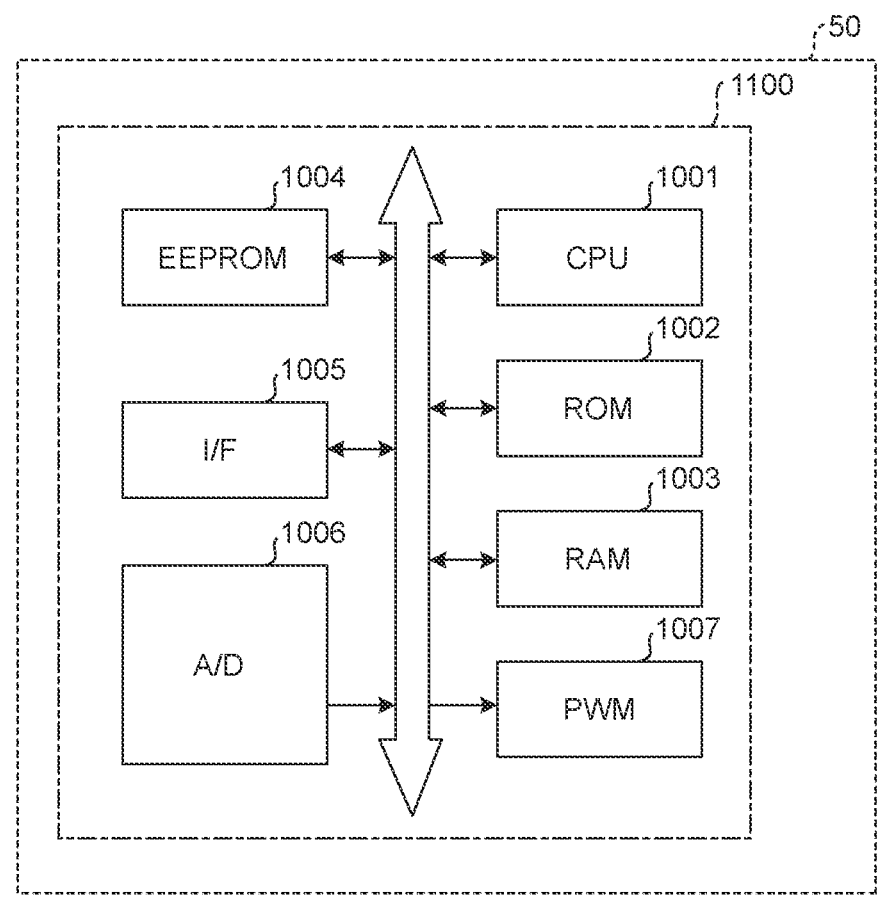
FIG. 2 is a schematic diagram illustrating a hardware configuration of a control unit configured to control an SBW system.

The control unit 50 is mainly configured as a CPU (including an MCU and an MPU). FIG. 2 is a schematic diagram illustrating a hardware configuration of the control unit configured to control the SBW system.

A control computer 1100 configured as the control unit 50 includes a central processing unit (CPU) 1001, a read only memory (ROM) 1002, a random access memory (RAM) 1003, an electrically erasable programmable rom (EEPROM) 1004, an interface (I/F) 1005, an analog/digital (A/D) converter 1006, and a pulse width modulation (PWM) controller 1007, and these components are connected with a bus.

The CPU 1001 is a processing device configured to execute a computer program for control (hereinafter referred to as a control program) of the SBW system and control the SBW system.

The ROM 1002 stores a control program for controlling the SBW system. In addition, the RAM 1003 is used as a work memory for operating the control program. The EEPROM 1004 stores, for example, control data input to and output from the control program. The control data is used on the control program loaded onto the RAM 1003 after the control unit 30 is powered on, and is overwritten to the EEPROM 1004 at a predetermined timing.

The ROM 1002, the RAM 1003, the EEPROM 1004, and the like are storage devices configured to store information and are storage devices (primary storage devices) directly accessible from the CPU 1001.

The A/D converter 1006 receives, for example, signals of the steering torque Ts and the steering angle $\theta h$ and converts the signals into digital signals.

The interface 1005 is connected with the CAN 40. The interface 1005 receives a signal (vehicle speed pulse) of a vehicle speed V from the vehicle speed sensor 12.

The PWM controller 1007 outputs a PWM control signal of each of the UVW phases based on a current command value to the reaction force motor 61 and the turning motor 71.

The configuration of a first embodiment in which the present disclosure is applied to such an SBW system will be described below.

Figure 3:
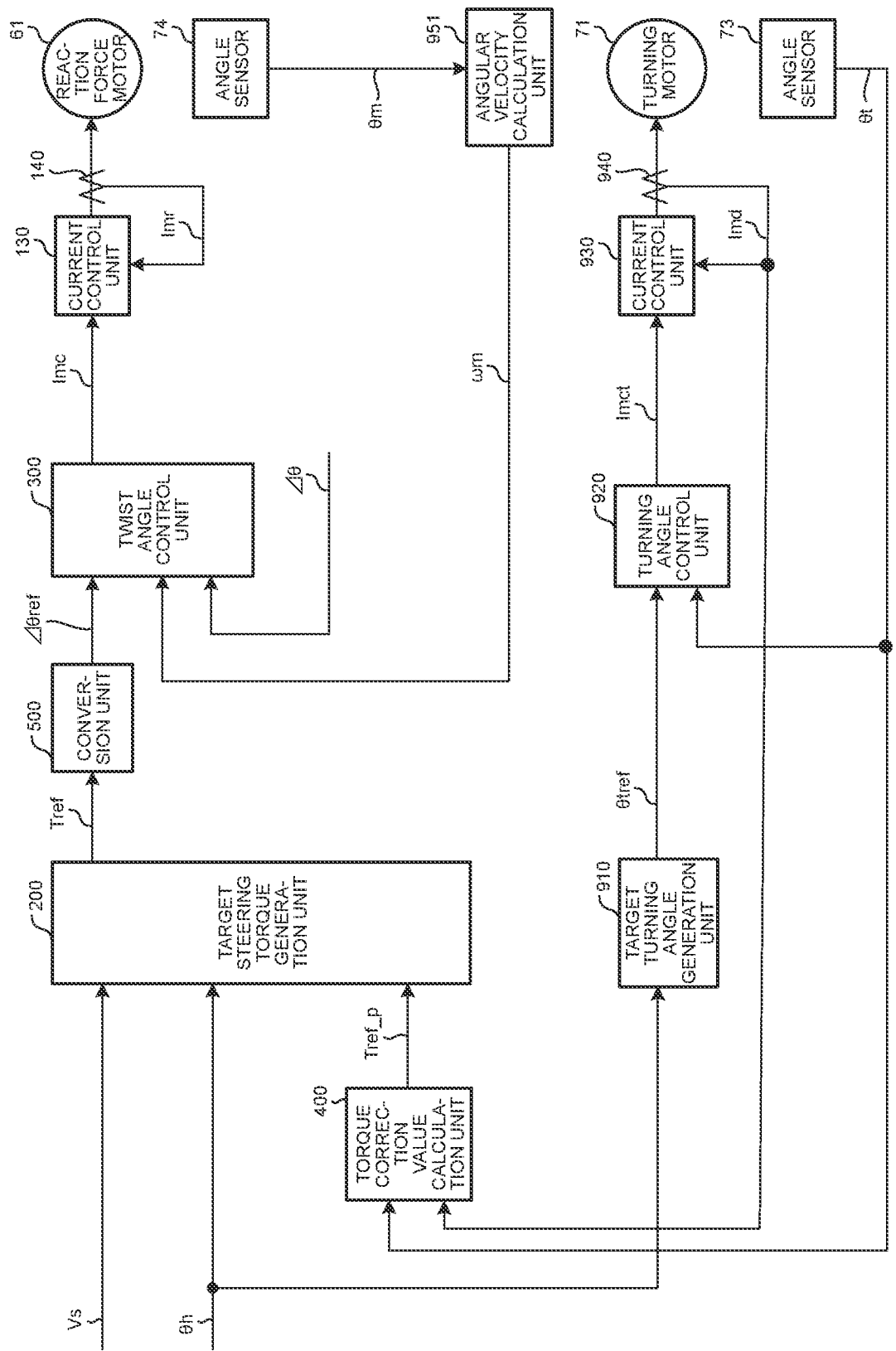
FIG. 3 is a diagram illustrating an exemplary internal block configuration of the control unit according to an embodiment.

FIG. 3 is a diagram illustrating an exemplary internal block configuration of the control unit according to the embodiment. In the present embodiment, control on a twist angle $\Delta\theta$ (hereinafter referred to as "twist angle control") and control on the turning angle $\theta t$ (hereinafter referred to as "turning angle control") are performed to control the reaction force device 60 by the twist angle control and control the drive device 70 by the turning angle control. Note that the drive device 70 may be controlled by any other control method. Note that, in the present embodiment, the twist angle $\Delta\theta$ is an angle obtained by an angle obtained through column-shaft conversion of an angle detected by the rudder angle sensor 14 provided at an upper part of the column shaft 2 of the wheel 1 and an angle obtained through column-shaft conversion of an angle detected by the angle sensor 74 provided at a lower part of the column shaft 2 of the wheel 1. Specifically, the twist angle $\Delta\theta$ is expressed as $\Delta\theta=\theta_2-\theta_1$ for the deviation between $\theta_1$ and $\theta_2$ when $\theta_1$ represents the angle obtained through column-shaft conversion of the angle detected by the rudder angle sensor 14 and $\theta_2$ represents the angle obtained through column-shaft conversion of the angle detected by the angle sensor 74.

The control unit 50 includes, as internal block components, a target steering torque generation unit 200, a twist angle control unit 300, a torque correction value calculation unit 400, a conversion unit 500, a target turning angle generation unit 910, and a turning angle control unit 920.

In the present disclosure, the target steering torque generation unit 200 generates target steering torque Tref that is a target value of steering torque of the reaction force device 60.

The conversion unit 500 converts the target steering torque Tref into a target twist angle $\Delta\theta$ref.

The twist angle control unit 300 generates a motor current command value Imc that is a control target value of current supplied to the reaction force motor 61.

The target turning angle generation unit 910 generates a target turning angle $\theta$tref based on the steering angle $\theta h$.

The turning angle control unit 920 calculates a motor current command value Imct with which the turning angle $\theta t$ is equal to the target turning angle $\theta$tref.

The torque correction value calculation unit 400 calculates, based on a current value Imd of the turning motor 71 (hereinafter also referred to as a "turning motor current value") and the turning angle $\theta t$, a torque signal Tref_p for obtaining the target steering torque Tref in accordance with road surface reaction force $T_{SAT}$ (refer to FIG. 11) estimated by a road surface reaction force estimation unit 410 to be described later.

First, the target steering torque generation unit 200 according to the present embodiment will be described below with reference to FIG. 4.

Figure 4:
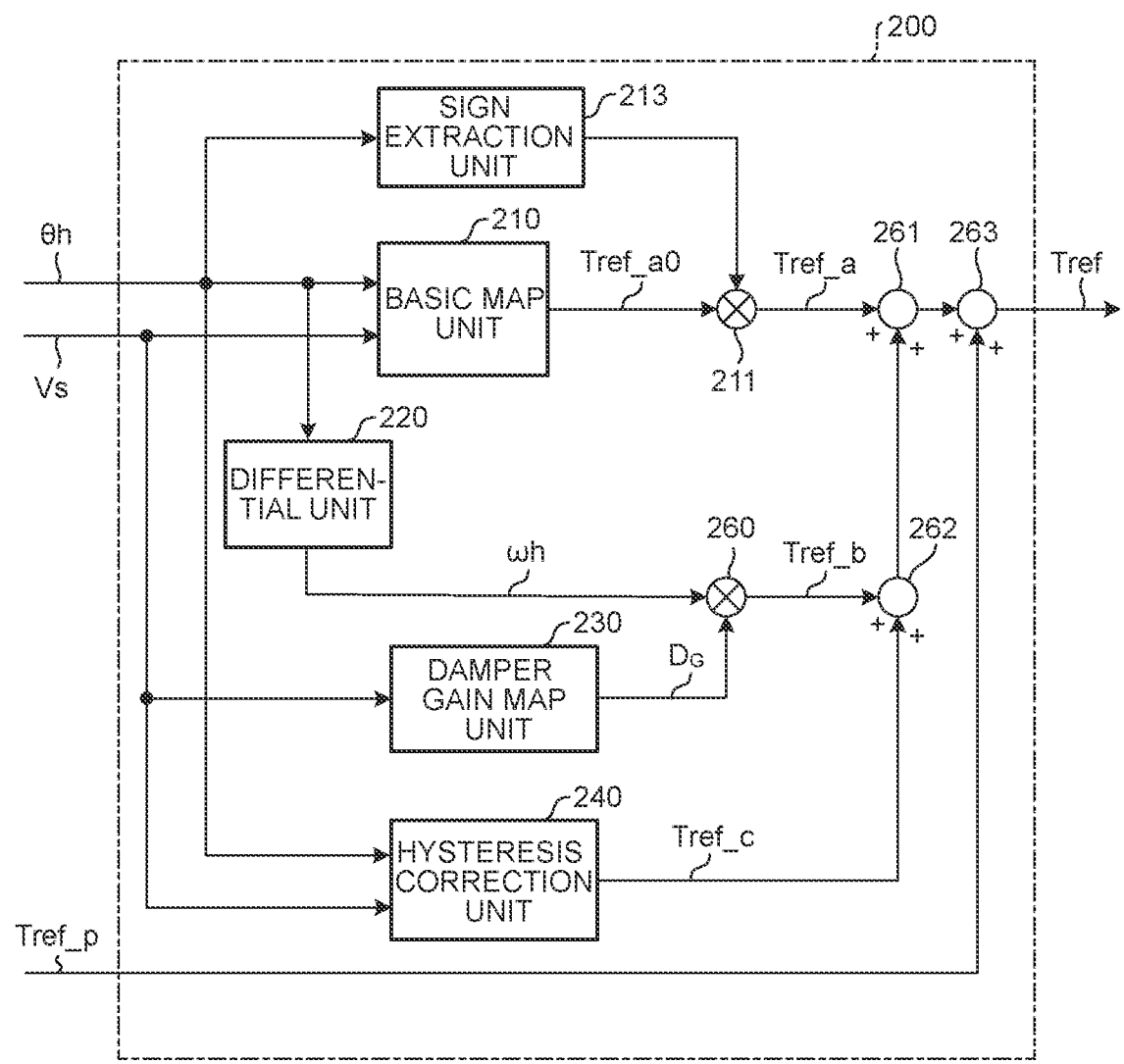
FIG. 4 is a block diagram illustrating an exemplary configuration of a target steering torque generation unit according to the embodiment.
Figure 5:
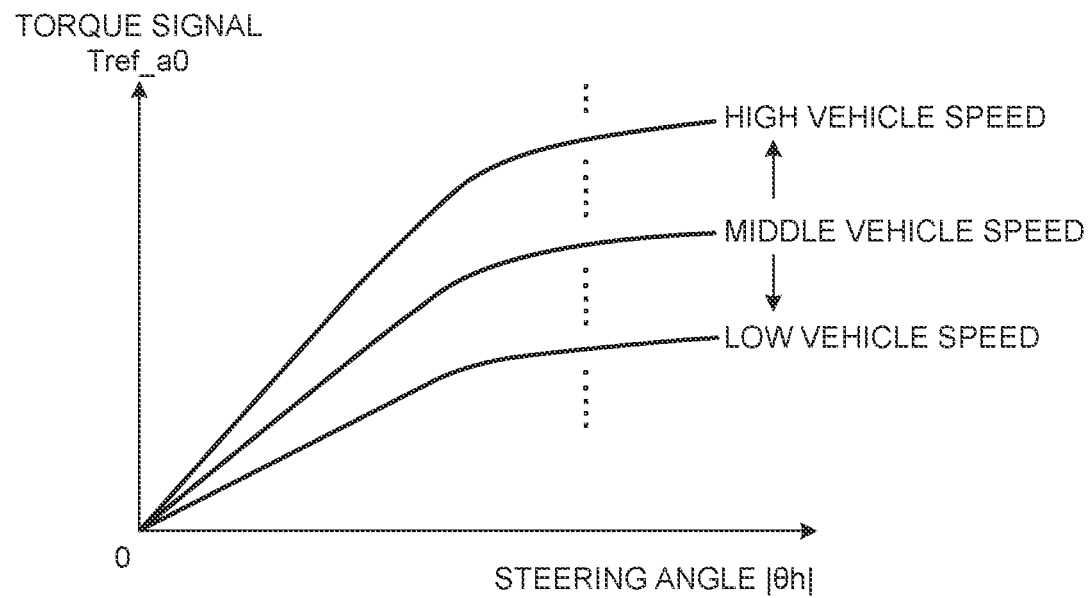
FIG. 5 is a diagram illustrating exemplary characteristics of a basic map held by a basic map unit.
Figure 6:
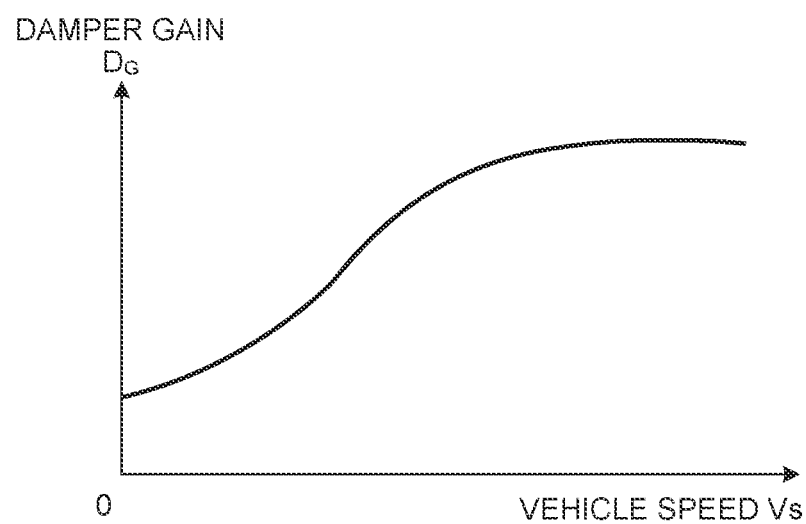
FIG. 6 is a diagram illustrating exemplary characteristics of a damper gain map held by a damper gain map unit.

FIG. 4 is a block diagram illustrating an exemplary configuration of the target steering torque generation unit according to the present embodiment. As illustrated in FIG. 4, the target steering torque generation unit 200 according to the present embodiment includes a basic map unit 210, a multiplication unit 211, a differential unit 220, a damper gain map unit 230, a hysteresis correction unit 240, a multiplication unit 260, and addition units 261, 262, and 263. FIG. 5 is a diagram illustrating exemplary characteristics of a basic map held by the basic map unit. FIG. 6 is a diagram illustrating exemplary characteristics of a damper gain map held by the damper gain map unit.

The steering angle θh and the vehicle speed Vs are input to the basic map unit 210. The basic map unit 210 outputs a torque signal Tref_a0 having the vehicle speed Vs as a parameter by using the basic map illustrated in FIG. 5. Specifically, the basic map unit 210 outputs the torque signal Tref_a0 in accordance with the vehicle speed Vs.

As illustrated in FIG. 5, the torque signal Tref_a0 has such a characteristic that the signal increases along a curve having a change rate that gradually decreases as the magnitude (absolute value) |θh| of the steering angle θh increases. In addition, the torque signal Tref_a0 has such a characteristic that the signal increases as the vehicle speed Vs increases. Note that, in FIG. 5, the map is configured in accordance with the magnitude |θh| of the steering angle θh but may be configured in accordance with the positive or negative value of the steering angle θh. In this case, the value of the torque signal Tref_a0 can be a positive or negative value, and sign calculation to be described later is unnecessary. The following description will be made on an aspect of outputting the torque signal Tref_a0 that is a positive value in accordance with the magnitude |θh| of the steering angle θh illustrated in FIG. 5.

Back in FIG. 4, a sign extraction unit 213 extracts the sign of the steering angle θh. Specifically, for example, the value of the steering angle θh is divided by the absolute value of the steering angle θh. Accordingly, the sign extraction unit 213 outputs "1" when the sign of the steering angle θh is "+", or outputs "−1" when the sign of the steering angle θh is "−". Specifically, the sign extraction unit 213 generates, for example, a sign function (sign(θh)) of the steering angle θh.

The multiplication unit 211 multiplies the torque signal Tref_a0 output from the basic map unit 210 by "1" or "−1" output from the sign extraction unit 213, and outputs the multiplied torque signal Tref_a0 as a torque signal Tref_a to the addition unit 261. Specifically, the multiplication unit 211 multiplies the torque signal Tref_a0 output from the basic map unit 210 by, for example, the sign function (sign(θh)) of the steering angle θh generated by the sign extraction unit 213, and outputs the multiplied torque signal Tref_a0 as the torque signal Tref_a to the addition unit 261.

The torque signal Tref_a in the present embodiment corresponds to a "first torque signal" in the present disclosure.

The steering angle θh is input to the differential unit 220. The differential unit 220 calculates a rudder angular velocity ωh that is angular velocity information by differentiating the steering angle θh. The differential unit 220 outputs the calculated rudder angular velocity ωh to the multiplication unit 260.

The vehicle speed Vs is input to the damper gain map unit 230. The damper gain map unit 230 outputs a damper gain $D_G$ in accordance with the vehicle speed Vs by using a vehicle speed sensitive damper gain map illustrated in FIG. 6.

As illustrated in FIG. 6, the damper gain $D_G$ has such a characteristic that the damper gain $D_G$ gradually increases as the vehicle speed Vs increases. The damper gain $D_G$ may be variable in accordance with the steering angle θh.

Back in FIG. 4, the multiplication unit 260 multiplies the rudder angular velocity ωh output from the differential unit 220 by the damper gain $D_G$ output from the damper gain map unit 230, and outputs a result of the multiplication as a torque signal Tref_b to the addition unit 262.

The hysteresis correction unit 240 calculates a torque signal Tref_c based on the steering angle θh and a steering state signal STs by using Expressions (1) and (2) described below. Although description is omitted here, the steering state signal STs is a state signal representing a result of determination of whether the steering direction is right or left based on the sign of a motor angular velocity ωm. Note that, in Expressions (1) and (2) below, x represents the steering angle θh, and $y_R$=Tref_c and $y_L$=Tref_c represent the torque signal (fourth torque signal) Tref_c. In addition, a coefficient "a" is a value larger than 1, and a coefficient "c" is a value larger than zero. A coefficient "Ahys" indicates the output width of a hysteresis characteristic, and the coefficient "c" indicates the roundness of the hysteresis characteristic.

$$y_R = Ahys\{1 - a^{-c(x-b)}\} \quad (1)$$

$$y_L = -Ahys\{1 - a^{c(x-b')}\} \quad (2)$$

In a case of right steering, the torque signal (fourth torque signal) Tref_c ($y_R$) is calculated by using Expression (1) above. In a case of left steering, the torque signal (fourth torque signal) Tref_c ($y_L$) is calculated by using Expression (2) above. Note that, when switching is made from right steering to left steering or when switching is made from left steering to right steering, a coefficient "b" or "b'" indicated in Expression (3) or (4) below is substituted into Expressions (1) and (2) above after steering switching based on the values of the final coordinates ($x_1$, $y_1$) that are the previous values of the steering angle θh and the torque signal Tref_c. Accordingly, continuity through steering switching is maintained.

$$b = x_1 + (1/c)\log_a\{1 - (y_1/Ahys)\} \quad (3)$$

$$b' = x_1 - (1/c)\log_a\{1 - (y_1/Ahys)\} \quad (4)$$

Expressions (3) and (4) above can be derived by substituting $x_1$ into x and substituting $y_1$ into $y_R$ and $y_L$ in Expressions (1) and (2) above.

For example, when Napier's constant e is used as the coefficient "a", Expressions (1), (2), (3), and (4) above can be expressed as Expressions (5), (6), (7), and (8) below, respectively.

$$y_R = Ahys[1 - \exp\{-c(x-b)\}] \quad (5)$$

$$y_L = -Ahys[\{1 - \exp\{c(x-b')\}] \quad (6)$$

$$b = x_1 + (1/c)\log_e\{1 - (y_1/Ahys)\} \quad (7)$$

$$b' = x_1 - (1/c)\log_e\{1 - (y_1/Ahys)\} \quad (8)$$

Figure 7:
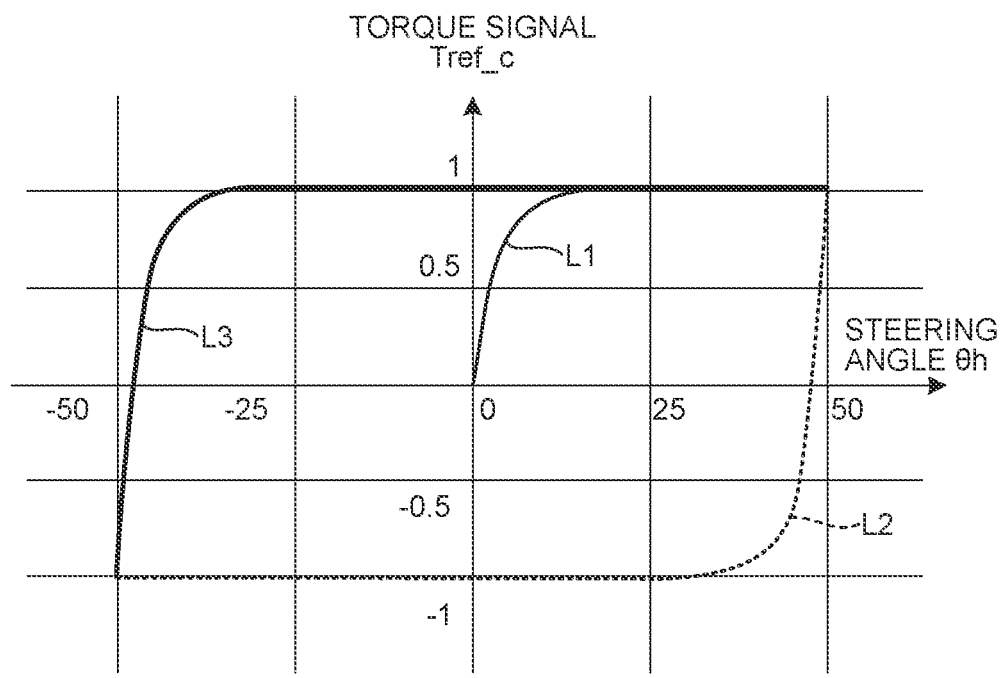
FIG. 7 is a diagram illustrating exemplary characteristics of a hysteresis correction unit.

FIG. 7 is a diagram illustrating exemplary characteristics of the hysteresis correction unit. The example illustrated in FIG. 7 indicates an exemplary characteristic of the torque signal Tref_c subjected to hysteresis correction when Ahys=1 [Nm] and c=0.3 are set in Expressions (7) and (8) above and steering is performed from 0 [deg] to +50 [deg] or −50 [deg]. As illustrated in FIG. 7, the torque signal Tref_c output from the hysteresis correction unit 240 has a hysteresis characteristic such as the origin at zero→L1 (thin line)→L2 (dashed line)→L3 (bold line).

Note that the coefficient Ahys, which indicates the output width of the hysteresis characteristic, and the coefficient "c", which indicates the roundness thereof may be variable in accordance with one or both of the vehicle speed Vs and the steering angle θh.

In addition, the rudder angular velocity ωh is obtained through the differential calculation on the steering angle θh but is subjected to low-pass filter (LPF) processing as appropriate to reduce influence of noise in a higher range. In addition, the differential calculation and the LPF processing may be performed with a high-pass filter (HPF) and a gain. Moreover, the rudder angular velocity ωh may be calculated by performing the differential calculation and the LPF processing not on the steering angle θh but on a wheel angle θ1 detected by an upper angle sensor or a column angle θ2 detected by a lower angle sensor. The motor angular velocity ωm may be used as the angular velocity information in place of the rudder angular velocity ωh, and in this case, the differential unit 220 is not needed.

The torque signals Tref_a, Tref_b, and Tref_c obtained as described above and the torque signal Tref_p calculated by the torque correction value calculation unit 400 are added at the addition units 261, 262, and 263 illustrated in FIG. 4 and output as the target steering torque Tref.

The torque signal Tref_p in the present embodiment corresponds to a "second torque signal" in the present disclosure. The torque correction value calculation unit 400 and the torque signal Tref_p will be described later.

Back in FIG. 3, the twist angle control unit 300 performs such control that the twist angle Δθ follows the target twist angle Δθref calculated through the target steering torque generation unit 200 and the conversion unit 500 by using the steering angle θh and the like. The motor angle θm of the reaction force motor 61 is detected at the angle sensor 74, and the motor angular velocity ωm is calculated by differentiating the motor angle θm at an angular velocity calculation unit 951. The turning angle θt is detected at the angle sensor 73. In addition, a current control unit 130 performs current control by driving the reaction force motor 61 based on the motor current command value Imc output from the twist angle control unit 300 and a current value Imr of the reaction force motor 61 detected at a motor current detector 140.

The twist angle control unit 300 will be described below with reference to FIG. 8.

Figure 8:
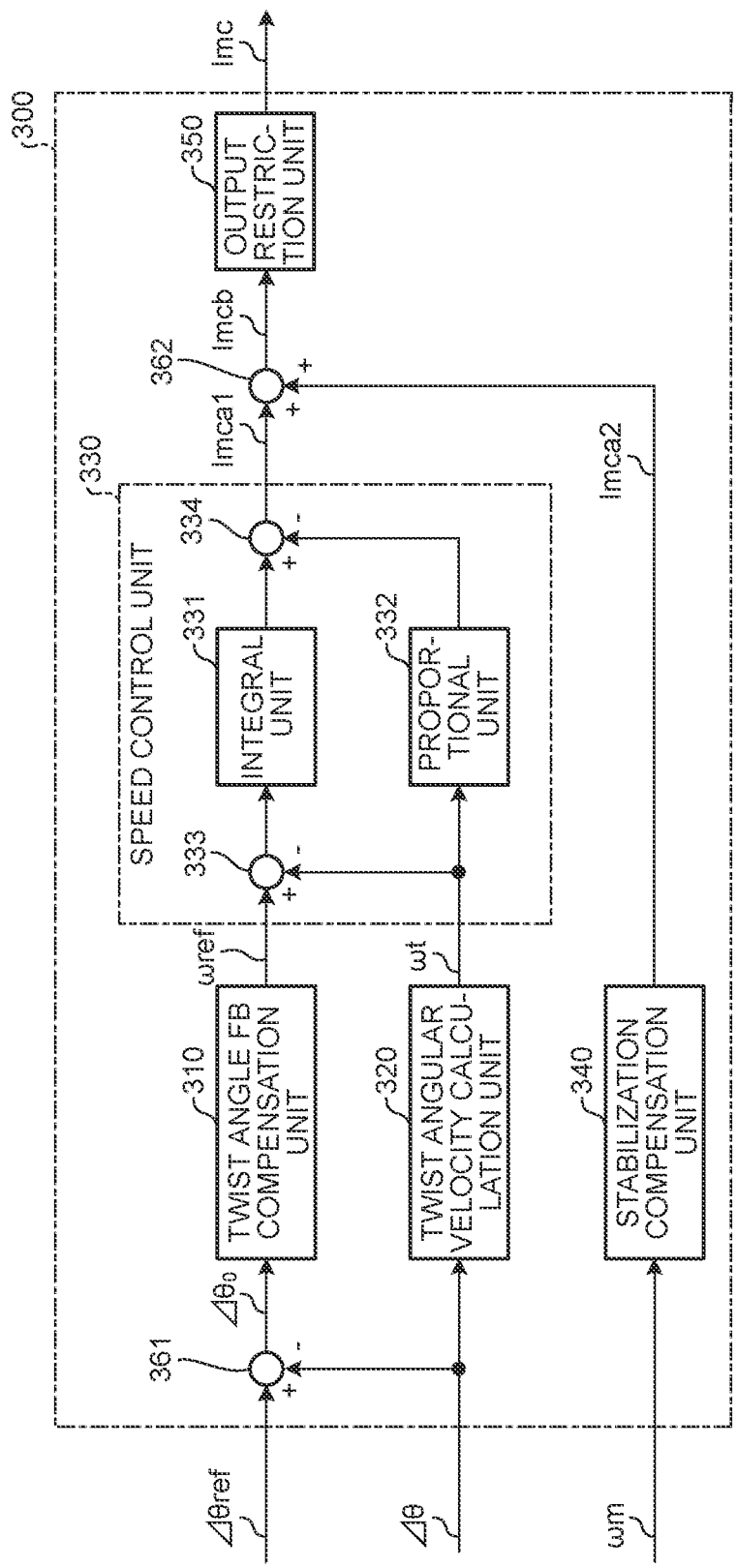
FIG. 8 is a block diagram illustrating an exemplary configuration of a twist angle control unit.

FIG. 8 is a block diagram illustrating an exemplary configuration of the twist angle control unit. The twist angle control unit 300 calculates the motor current command value Imc based on the target twist angle Δθref, the twist angle Δθ, and the motor angular velocity ωm. The twist angle control unit 300 includes a twist angle feedback (FB) compensation unit 310, a twist angular velocity calculation unit 320, a speed control unit 330, a stabilization compensation unit 340, an output restriction unit 350, a subtraction unit 361, and an addition unit 362.

The target twist angle Δθref output from the conversion unit 500 is input to the subtraction unit 361 through addition. The twist angle Δθ is input to the subtraction unit 361 through subtraction and also input to the twist angular velocity calculation unit 320. The motor angular velocity ωm is input to the stabilization compensation unit 340.

The twist angle FB compensation unit 310 multiplies a deviation Δθ0 between the target twist angle Δθref and the twist angle Δθ, which is calculated at the subtraction unit 361, by a compensation value CFB (transfer function) and outputs a target twist angular velocity ωref with which the twist angle Δθ follows the target twist angle Δθref. The compensation value CFB may be a simple gain Kpp, or a typically used compensation value such as a PI control compensation value.

The target twist angular velocity ωref is input to the speed control unit 330. With the twist angle FB compensation unit 310 and the speed control unit 330, it is possible to cause the target twist angle Δθref to follow the twist angle Δθ, thereby achieving desired steering torque.

The twist angular velocity calculation unit 320 calculates a twist angular velocity ωt by performing differential arithmetic processing on the twist angle Δθ. The twist angular velocity ωt is output to the speed control unit 330. The twist angular velocity calculation unit 320 may perform, as differential calculation, pseudo differentiation with the HPF and a gain. Alternatively, the twist angular velocity calculation unit 320 may calculate the twist angular velocity ωt by another means, or based on a factor other than the twist angle Δθ, and may output the calculated twist angular velocity ωt to the speed control unit 330.

The speed control unit 330 calculates, through I-P control (proportional preceding PI control), a motor current command value Imca1 with which a twist angular velocity ωt follows the target twist angular velocity ωref.

A subtraction unit 333 calculates the difference (ωref−ωt) between the target twist angular velocity ωref and the twist angular velocity ωt. An integral unit 331 integrates the difference (ωref−ωt) between the target twist angular velocity ωref and the twist angular velocity ωt and inputs a result of the integration to a subtraction unit 334 through addition.

The twist angular velocity ωt is also output to a proportional unit 332. The proportional unit 332 performs proportional processing with a gain Kvp on the twist angular velocity ωt and inputs a result of the proportional processing to the subtraction unit 334 through subtraction. A result of the subtraction at the subtraction unit 334 is output as the motor current command value Imca1. Note that the speed control unit 330 may calculate the motor current command value Imca1 not by I-P control but by a typically used control method such as PI control, P (proportional) control, PID (proportional-integral-differential) control, PI-D control (differential preceding PID control), model matching control, or model reference control.

The stabilization compensation unit 340 has a compensation value Cs (transfer function) and calculates a motor current command value Imca2 from the motor angular velocity ωm. When gains of the twist angle FB compensation unit 310 and the speed control unit 330 are increased to improve the following capability and the disturbance characteristic, a controlled oscillation phenomenon occurs in a higher range. To avoid this, the transfer function (Cs) necessary for stabilization of the motor angular velocity ωm is set to the stabilization compensation unit 340. Accordingly, stabilization of the entire reaction force device control system can be achieved.

The addition unit 362 adds the motor current command value Imca1 from the speed control unit 330 and the motor current command value Imca2 from the stabilization compensation unit 340, and outputs a result of the addition as a motor current command value Imcb.

The upper and lower limit values of the motor current command value Imcb are set to the output restriction unit 350 in advance. The output restriction unit 350 outputs the motor current command value Imc with restriction on the upper and lower limit values of the motor current command value Imcb.

Note that the configuration of the twist angle control unit 300 in the present embodiment is exemplary and may be different from the configuration illustrated in FIG. 8. For example, the twist angle control unit 300 may not include the stabilization compensation unit 340.

Back in FIG. 3, in the turning angle control unit 920, the target turning angle θtref is generated based on the steering angle θh at the target turning angle generation unit 910. The target turning angle θtref together with the turning angle θt is input to the turning angle control unit 920, and the motor current command value Imct with which the turning angle at is equal to the target turning angle θtref is calculated at the turning angle control unit 920. Then, a current control unit 930 performs current control by driving the turning motor 71 based on the motor current command value Imct and the turning motor current value Imd detected at a motor current detector 940 with configurations and operations same as those of the current control unit 130.

The target turning angle generation unit 910 will be described below with reference to FIG. 9.

Figure 9:
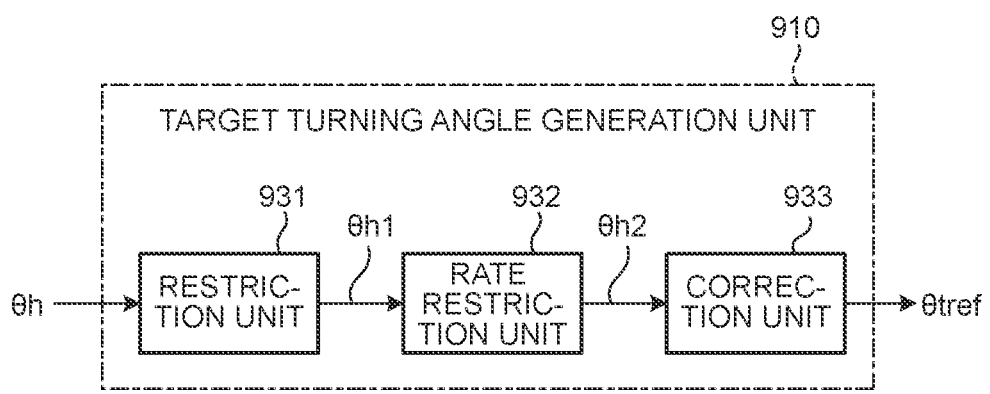
FIG. 9 is a block diagram illustrating an exemplary configuration of a target turning angle generation unit.

FIG. 9 is a block diagram illustrating an exemplary configuration of the target turning angle generation unit. The target turning angle generation unit 910 includes a restriction unit 931, a rate restriction unit 932, and a correction unit 933.

The restriction unit 931 outputs a steering angle θh1 with restriction on the upper and lower limit values of the steering angle θh. Similarly to the output restriction unit 350 in the twist angle control unit 300 illustrated in FIG. 8, the upper and lower limit values of the steering angle θh are set in advance and restricted.

To avoid abrupt change of the steering angle, the rate restriction unit 932 provides restriction by setting a restriction value for the change amount of the steering angle θh1, and outputs a steering angle θh2. For example, the change amount is set to be the difference from the steering angle θh1 at the preceding sample. When the absolute value of the change amount is larger than a predetermined value (restriction value), the steering angle θh1 is subjected to addition or subtraction so that the absolute value of the change amount becomes equal to the restriction value, and the resultant steering angle θh1 is output as the steering angle θh2. When the absolute value of the change amount is equal to or smaller than the restriction value, the steering angle θh1 is directly output as the steering angle θh2. Note that restriction may be provided by setting the upper and lower limit values of the change amount instead of setting the restriction value for the change amount, or restriction may be provided on a change rate or a difference rate in place of the change amount.

The correction unit 933 corrects the steering angle θh2 and outputs the target turning angle θtref.

Note that the configuration of the target turning angle generation unit 910 in the present embodiment is exemplary and may be different from the configuration illustrated in FIG. 9.

The turning angle control unit 920 illustrated in FIG. 3 will be described below with reference to FIG. 10.

Figure 10:
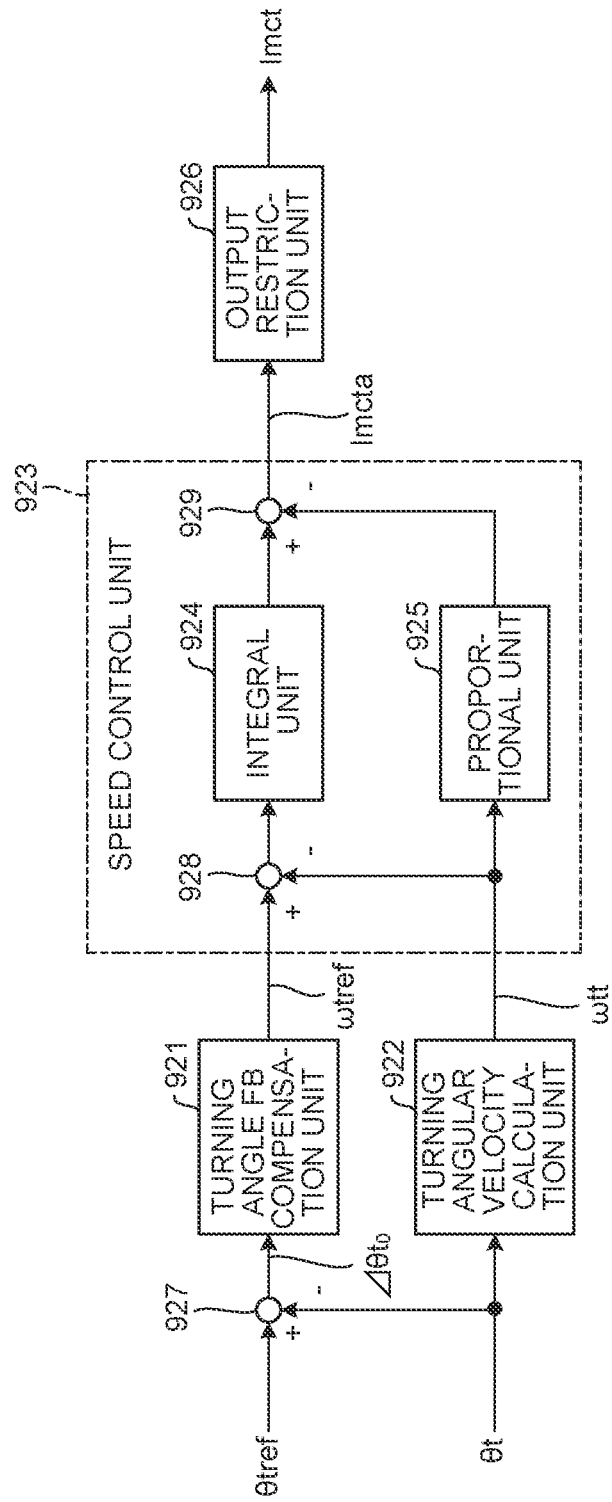
FIG. 10 is a block diagram illustrating an exemplary configuration of a turning angle control unit.

FIG. 10 is a block diagram illustrating an exemplary configuration of the turning angle control unit. The turning angle control unit 920 calculates the motor current command value Imct based on the target turning angle θtref and the turning angle θt of the steering wheels 8L and 8R. The turning angle control unit 920 includes a turning angle feedback (FB) compensation unit 921, a turning angular velocity calculation unit 922, a speed control unit 923, an output restriction unit 926, and a subtraction unit 927.

The target turning angle θtref output from the target turning angle generation unit 910 is input to the subtraction unit 927 through addition. The turning angle θt is input to the subtraction unit 927 through subtraction and also input to the turning angular velocity calculation unit 922.

The turning angle FB compensation unit 921 multiplies a deviation Δθt0 between a target turning angular velocity ωtref, which is calculated at the subtraction unit 927, and the turning angle θt by the compensation value CFB (transfer function), and outputs the target turning angular velocity ωtref with which the turning angle θt follows the target turning angle θtref. The compensation value CFB may be a simple gain Kpp, or a typically used compensation value such as a PI control compensation value.

The target turning angular velocity ωtref is input to the speed control unit 923. With the turning angle FB compensation unit 921 and the speed control unit 923, it is possible to cause the target turning angle θtref to follow the turning angle θt, thereby achieving desired torque.

The turning angular velocity calculation unit 922 calculates a turning angular velocity ωtt by performing differential arithmetic processing on the turning angle θt. The turning angular velocity ωtt is output to the speed control unit 923.

The speed control unit 923 calculates, through I-P control (proportional preceding PI control), a motor current command value (first current command value) Imcta with which the turning angular velocity ωtt follows the target turning angular velocity ωtref. Note that the speed control unit 923 may calculate the motor current command value (first current command value) Imcta not by I-P control but by a typically used control method such as PI control, P (proportional) control, PID (proportional-integral-differential) control, PI-D control (differential preceding PID control), model matching control, or model reference control.

A subtraction unit 928 calculates the difference (ωtref−ωtt) between the target turning angular velocity ωtref and the turning angular velocity ωtt. An integral unit 924 integrates the difference (ωtref−ωtt) between the target turning angular velocity ωtref and the turning angular velocity ωtt, and inputs a result of the integration to a subtraction unit 929 through addition.

The turning angular velocity ωtt is also output to a proportional unit 925. The proportional unit 925 performs proportional processing on the turning angular velocity ωtt and inputs a result of the proportional processing to the subtraction unit 929 through subtraction.

The output restriction unit 926 performs output restriction processing on the motor current command value (first current command value) Imcta and outputs the motor current command value (second current command value) Imct. The upper and lower limit values of the motor current command value Imcta are set to the output restriction unit 926 in advance. The output restriction unit 926 restricts the upper and lower limit values of the motor current command value Imcta and outputs the motor current command value Imct.

Note that the configuration of the turning angle control unit 920 in the present embodiment is exemplary and may be different from the configuration illustrated in FIG. 10.

Figure 11:
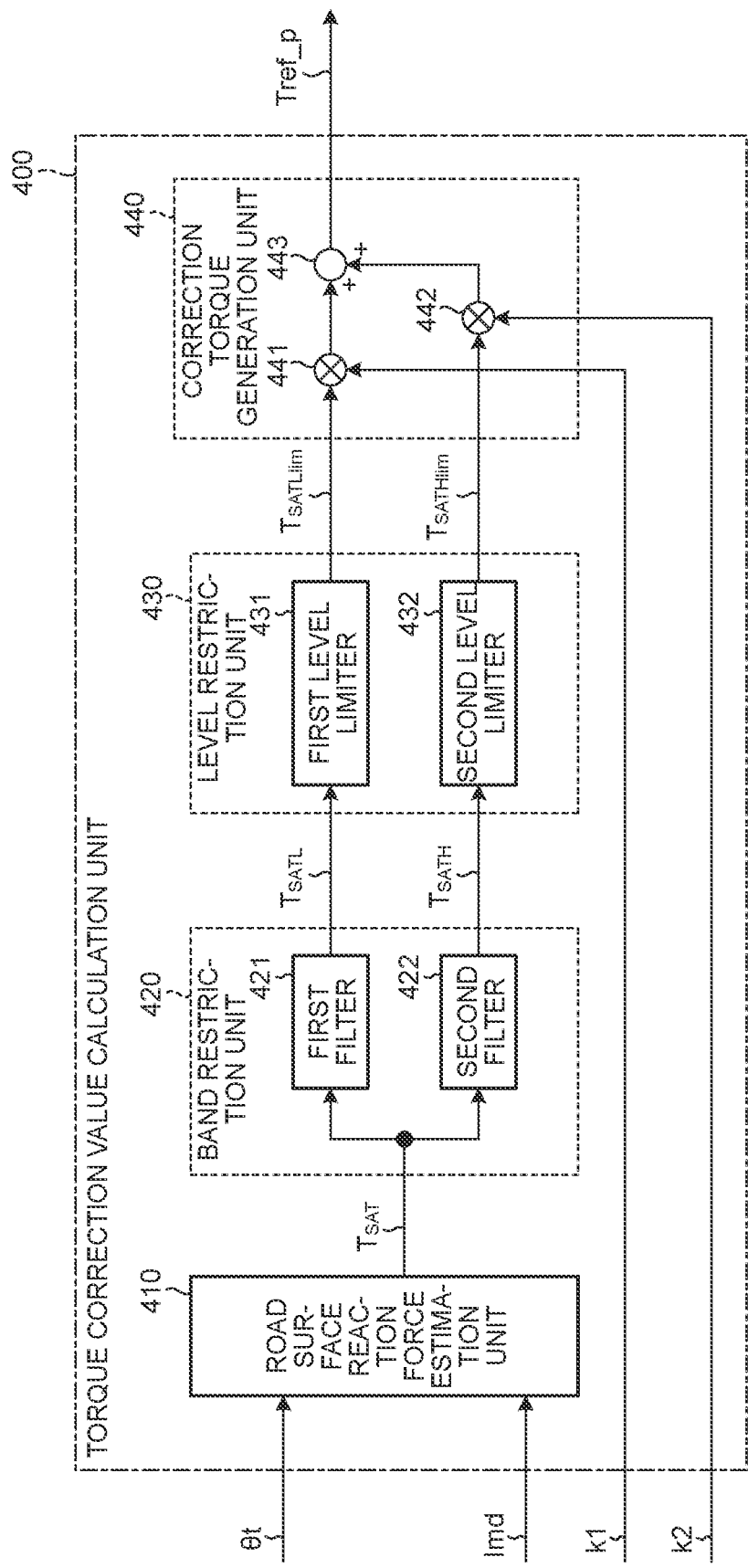
FIG. 11 is a block diagram illustrating an exemplary configuration of a torque correction value calculation unit according to the embodiment.

The torque correction value calculation unit 400 illustrated in FIG. 3 according to the present embodiment will be described below with reference to FIGS. 11 to 25. FIG. 11 is a block diagram illustrating an exemplary configuration of the torque correction value calculation unit according to the embodiment.

The vehicle steering device according to the present embodiment estimates the road surface reaction force $T_{SAT}$ acting on the steering wheels 8L and 8R as actual force is physically exerted, and obtains the target steering torque Tref in accordance with the estimated road surface reaction force $T_{SAT}$. As illustrated in FIG. 11, the torque correction value calculation unit 400 according to the present embodiment includes the road surface reaction force estimation unit 410, a band restriction unit 420, a level restriction unit 430, and a correction torque generation unit 440.

Figure 12:
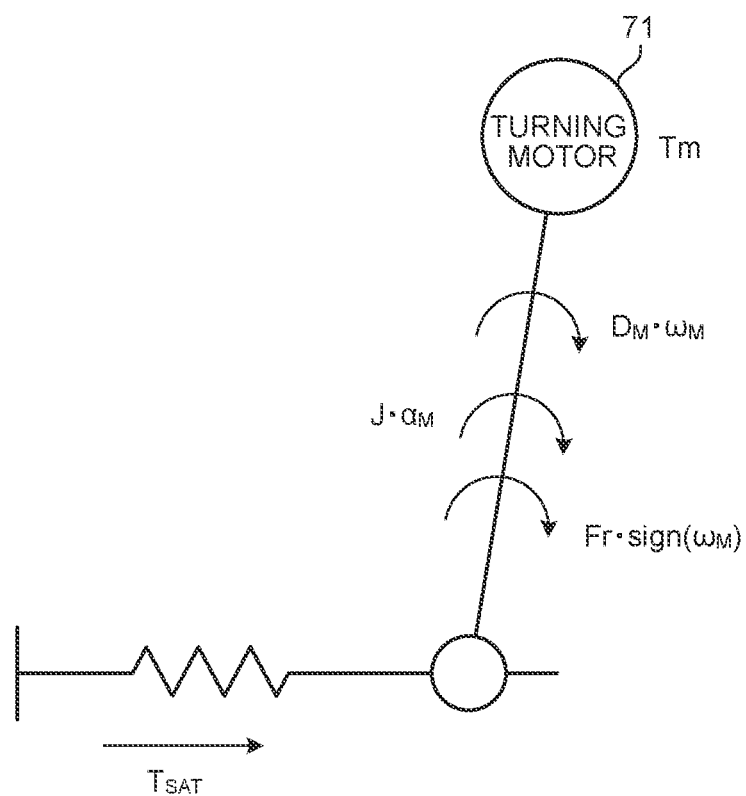
FIG. 12 is a conceptual view illustrating the status of torque generated between a road surface and a turning motor.

The status of torque generated between a road surface and the turning motor 71 will be described below with reference to FIG. 12. FIG. 12 is a conceptual view illustrating the status of torque generated between the road surface and the turning motor.

The target turning angle θtref is generated as the driver steers the wheel, and the turning motor 71 generates, in accordance with the target turning angle θtref, turning motor torque Tm that turns the steering wheels 8L and 8R. As a result, the steering wheels 8L and 8R are turned, and the road surface reaction force $T_{SAT}$ is generated. In this case, torque as resistance is generated by inertia (column-shaft conversion inertia) J that acts on the column shaft by the turning motor 71 (rotor thereof), the deceleration mechanism, or the like, and friction (static friction) Fr. In addition, physical torque (viscosity torque) expressed as a damper term (damper coefficient $D_M$) is generated by the rotational speed of the turning motor 71. The equation of motion in Expression (9) below is obtained from balancing among these forces.

$$J \times \alpha_M + Fr \times \text{sign}(\omega_M) + D_M \times \omega_M = Tm - T_{SAT} \quad (9)$$

In Expression (9) above, $\omega_M$ is a motor angular velocity subjected to column-shaft conversion (conversion into a value for the column shaft), and $\alpha_M$ is a motor angular acceleration subjected to column-shaft conversion. When Expression (9) above is solved for the road surface reaction force $T_{SAT}$, Expression (10) below is obtained.

$$T_{SAT} = Tm - J \times \alpha_M - Fr \times \text{sign}(\omega_M) - D_M \times \omega_M \quad (10)$$

As understood from Expression (10) above, when the column-shaft conversion inertia J, the static friction Fr, and the damper coefficient $D_M$ are determined as constants in advance, the road surface reaction force $T_{SAT}$ can be calculated from the motor angular velocity $\omega_M$, the motor angular acceleration $\alpha_M$, and the turning motor torque Tm. Note that, for simplification, the column-shaft conversion inertia J may be a value converted for the column shaft by using a relational expression of motor inertia and a speed reduction ratio.

The turning motor current value Imd and the turning angle θt are input to the road surface reaction force estimation unit 410. The road surface reaction force estimation unit 410 calculates the road surface reaction force $T_{SAT}$ by using Expression (10) above.

Figure 13:
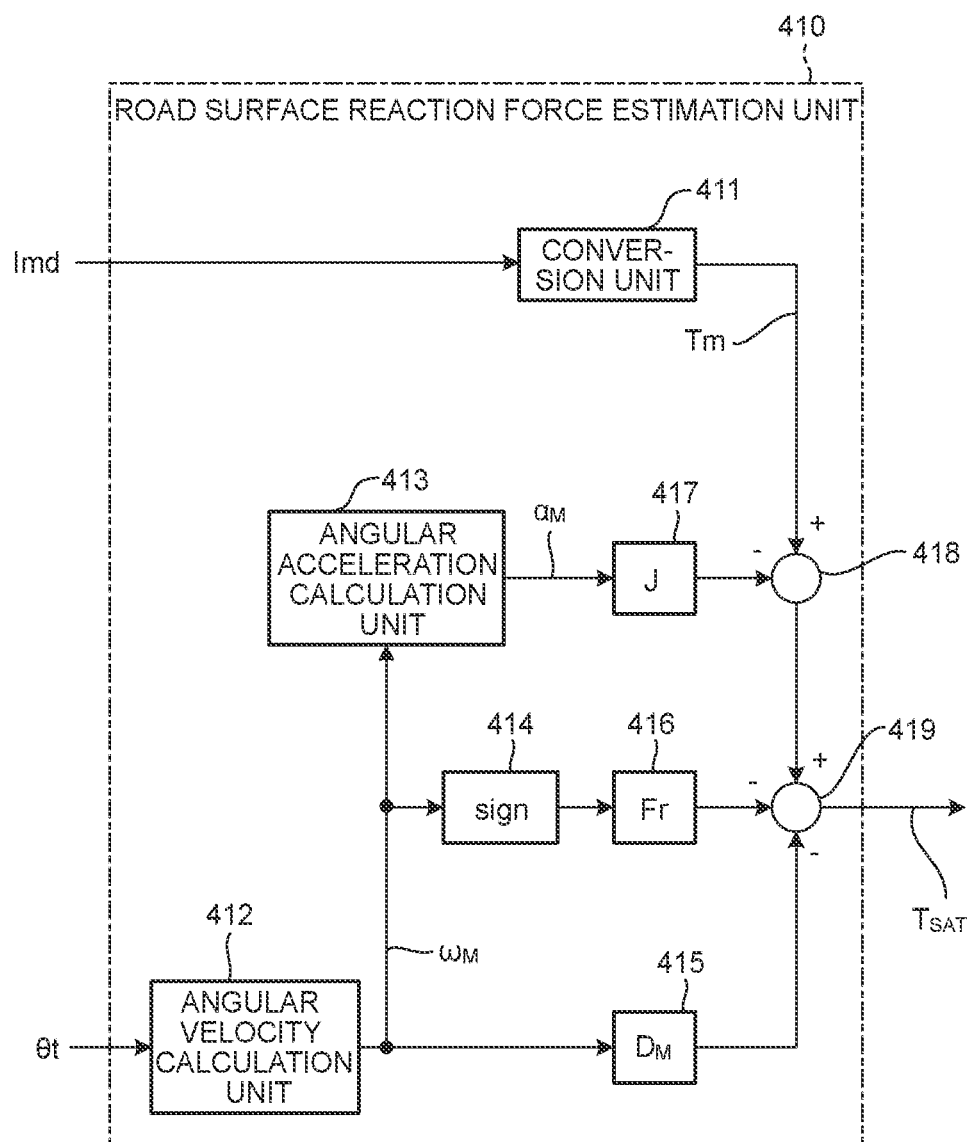
FIG. 13 is a block diagram illustrating an exemplary configuration of a road surface reaction force estimation unit.

FIG. 13 is a block diagram illustrating an exemplary configuration of the road surface reaction force estimation unit. The road surface reaction force estimation unit 410 includes a conversion unit 411, an angular velocity calculation unit 412, an angular acceleration calculation unit 413, a block 414, a block 415, a block 416, a block 417, and subtraction units 418 and 419.

The turning motor current value Imd is input to the conversion unit 411. The conversion unit 411 calculates the turning motor torque Tm subjected to column-shaft conversion through multiplication by a predetermined gear ratio and a predetermined torque constant.

The turning angle θt is input to the angular velocity calculation unit 412. The angular velocity calculation unit 412 calculates the motor angular velocity $\omega_M$ subjected to column-shaft conversion by converting the turning angle θt into the angle of the turning motor 71 and performing differential arithmetic processing and gear ratio division on the angle of the turning motor 71.

The motor angular velocity $\omega_M$ is input to the angular acceleration calculation unit 413. The angular acceleration calculation unit 413 calculates the motor angular acceleration am subjected to column-shaft conversion by differentiating the motor angular velocity $\omega_M$.

Then, with the configuration illustrated in FIG. 13, the road surface reaction force $T_{SAT}$ is calculated based on Expression (10) above by using the turning motor torque Tm, the motor angular velocity $\omega_M$, and the motor angular acceleration $\alpha_M$ described above.

The motor angular velocity $\omega_M$ output from the angular velocity calculation unit 412 is input to the block 414. The block 414 functions as a sign function and outputs the sign of the input data.

The motor angular velocity $\omega_M$ output from the angular velocity calculation unit 412 is input to the block 415. The block 415 multiplies the input data by the damper coefficient $D_M$ and outputs a result of the multiplication.

The block 416 multiplies the input data from the block 414 by the static friction Fr and outputs a result of the multiplication.

The motor angular acceleration $\alpha_M$ output from the angular acceleration calculation unit 413 is input to the block 417. The block 417 multiplies the input data by the column-shaft conversion inertia J and outputs a result of the multiplication.

The subtraction unit 418 subtracts the output from the block 417 from the turning motor torque Tm output from the conversion unit 411.

The subtraction unit 419 subtracts the output from the block 415 and the output from the block 416 from an output from the subtraction unit 418.

With the above-described configuration, Expression (10) above can be achieved. Specifically, the road surface reaction force $T_{SAT}$ is calculated by the configuration of the road surface reaction force estimation unit 410 illustrated in FIG. 13.

Note that, in an aspect in which the angle of the turning motor 71 is detected, the angular velocity calculation unit 412 calculates the motor angular velocity $\omega_M$ subjected to column-shaft conversion through differential arithmetic processing and gear ratio division on the detected angle of the turning motor 71. Alternatively, when the column angle can be directly detected, the column angle may be used as angle information in place of the turning angle θt and the angle of the turning motor 71. In this case, column-shaft conversion is unnecessary. Alternatively, a signal obtained through column-shaft conversion of the turning angular velocity or the turning motor angular velocity in place of the turning angle θt and the angle of the turning motor 71 may be input as the motor angular velocity $\omega_M$, and the differential processing on the angle of the turning motor 71 may be omitted. Moreover, the road surface reaction force $T_{SAT}$ may be calculated by a method other than that described above, or a detected value corresponding to the road surface reaction force $T_{SAT}$ may be used.

As illustrated in FIG. 11, the band restriction unit 420 bifurcates the road surface reaction force $T_{SAT}$ output from the road surface reaction force estimation unit 410 into first band-restricted road surface reaction force $T_{SATL}$ and second band-restricted road surface reaction force $T_{SATH}$ that are restricted to respective different frequency bands. Specifically, as illustrated in, for example, FIG. 11, the band restriction unit 420 includes a first filter 421 and a second filter 422 having respective different passbands.

Figure 14:
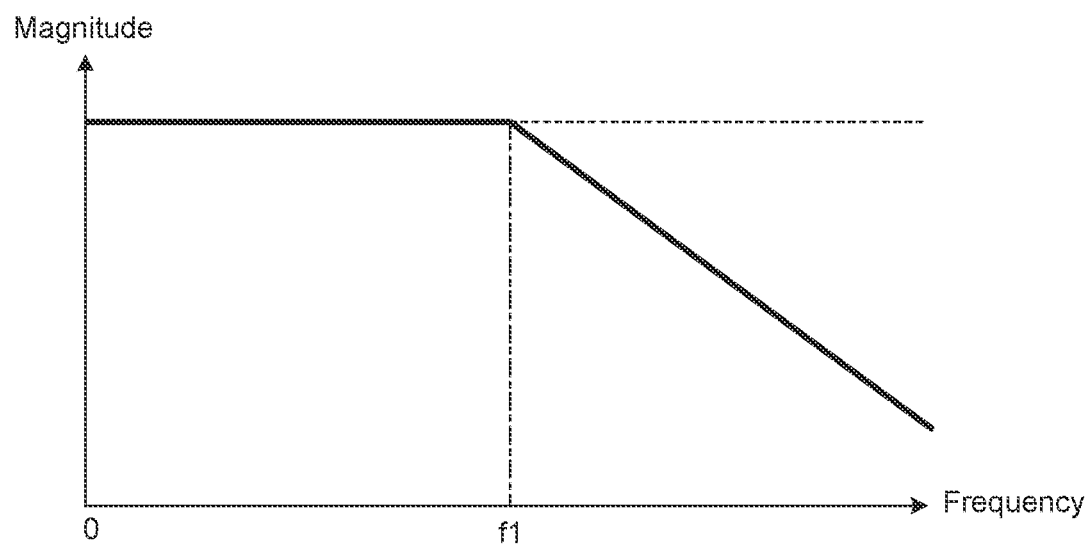
FIG. 14 is a schematic diagram illustrating exemplary characteristics of a first filter.
Figure 15:
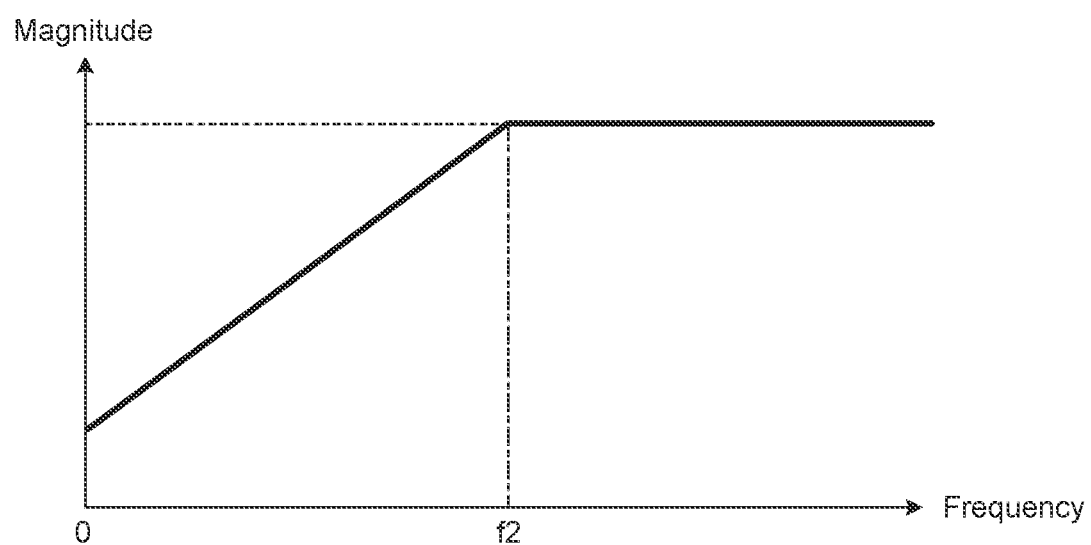
FIG. 15 is a schematic diagram illustrating exemplary characteristics of a second filter.

FIG. 14 is a schematic diagram illustrating exemplary characteristics of the first filter. FIG. 15 is a schematic diagram illustrating exemplary characteristics of the second filter. In the present embodiment, as illustrated in FIG. 14, the first filter 421 is a low-pass filter (hereinafter also referred to as an "LPF") having a passband equal to a first frequency band equal to or lower than a frequency f1. In addition, in the present embodiment, as illustrated in FIG. 15, the second filter 422 is a high-pass filter ((hereinafter also referred to as an "HPF")) having a passband equal to a second frequency band equal to or higher than a frequency f2. In other words, the first filter 421 is an LPF having a cutoff frequency equal to the frequency f1, and the second filter 422 is an HPF having a cutoff frequency equal to the frequency f2.

Back in FIG. 11, the road surface reaction force $T_{SAT}$ output from the road surface reaction force estimation unit 410 is bifurcated into two paths at the band restriction unit 420 and input to the first filter 421 and the second filter 422. The band restriction unit 420 outputs the first band-restricted road surface reaction force $T_{SATL}$, which is an output from the first filter 421, and the second band-restricted road surface reaction force $T_{SATH}$, which is an output from the second filter 422.

Figure 16:
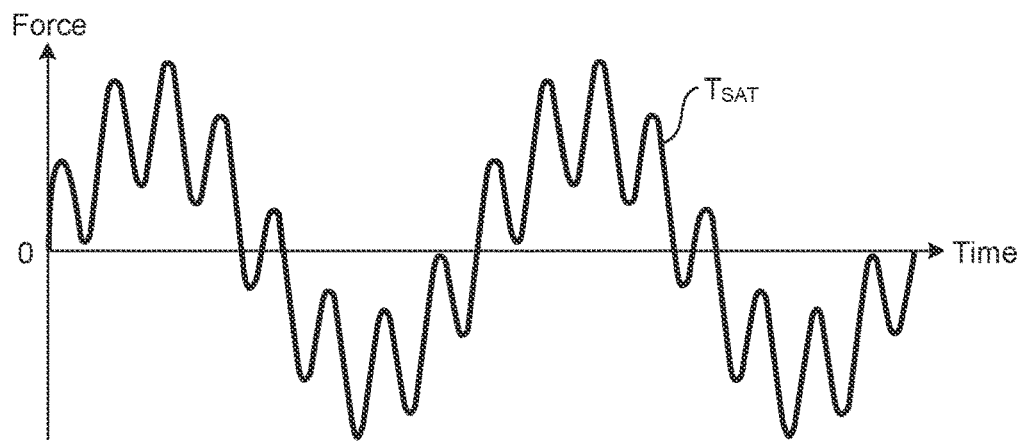
FIG. 16 is a diagram illustrating exemplary road surface reaction force.
Figure 17:
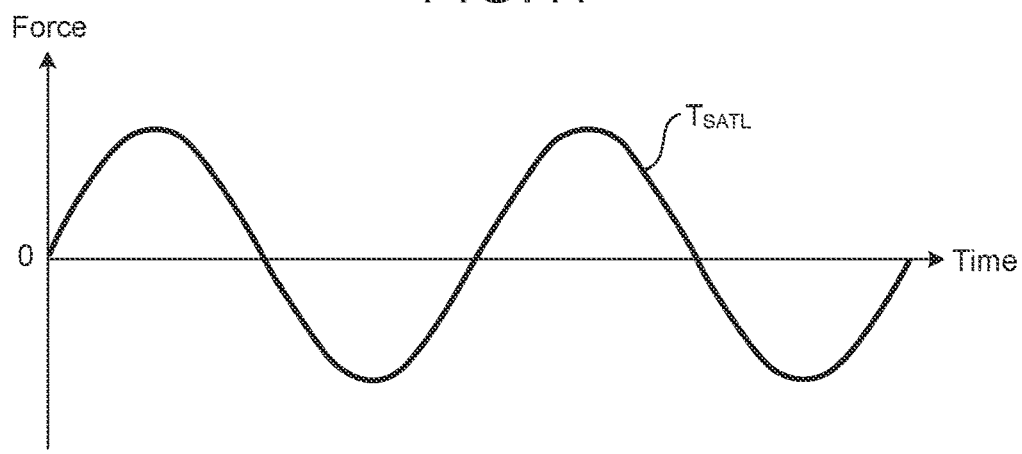
FIG. 17 is a diagram illustrating an example of first band-restricted road surface reaction force that is an output from the first filter.
Figure 18:
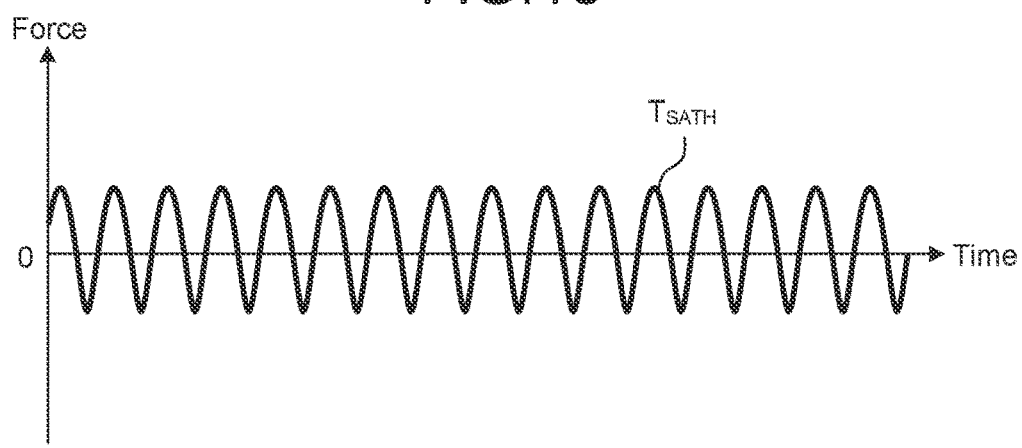
FIG. 18 is a diagram illustrating an example of second band-restricted road surface reaction force that is an output from the second filter.

FIG. 16 is a diagram illustrating an example of the road surface reaction force. FIG. 17 is a diagram illustrating an example of first band-restricted road surface reaction force that is an output from the first filter. FIG. 18 is a diagram illustrating an example of second band-restricted road surface reaction force that is an output from the second filter. In FIGS. 16, 17, and 18, for simplification of description, a synthesis signal of a sinusoidal signal included in the first frequency band as the passband of the first filter 421 and a sinusoidal signal included in the second frequency band as the passband of the second filter 422 is exemplarily illustrated as the road surface reaction force.

The road surface reaction force $T_{SAT}$ illustrated in FIG. 16 is band-restricted to the first band-restricted road surface reaction force $T_{SATL}$ illustrated in FIG. 17 through the first filter 421 and output, and is band-restricted to the second band-restricted road surface reaction force $T_{SATH}$ illustrated in FIG. 18 through the second filter 422 and output.

Note that low-frequency and high-frequency components of the road surface reaction force $T_{SAT}$ can be separated when the magnitude relation between the cutoff frequency f1 of the first filter 421 and the cutoff frequency f2 of the second filter 422 is set to be f1≤f2, but the magnitude relation between the cutoff frequency f1 of the first filter 421 and the cutoff frequency f2 of the second filter 422 is more preferably set to be f1<f2 because the low-frequency and high-frequency components of the road surface reaction force $T_{SAT}$ can be more clearly separated. The cutoff frequency f1 of the first filter 421 and the cutoff frequency f2 of the second filter 422 may be set as appropriate in accordance with an assumed characteristic of road surface reaction force.

Back in FIG. 11, the level restriction unit 430 provides level restriction on each of the first band-restricted road surface reaction force $T_{SATL}$ and the second band-restricted road surface reaction force $T_{SATH}$ output from the band restriction unit 420, by the upper and lower limit values. Specifically, as illustrated in, for example, FIG. 11, the level restriction unit 430 includes a first level limiter 431 configured to provide level restriction on the first band-restricted road surface reaction force $T_{SATL}$ by the upper and lower limit values, and a second level limiter 432 configured to provide level restriction on the second band-restricted road surface reaction force $T_{SATH}$ by the upper and lower limit values.

Figure 19:
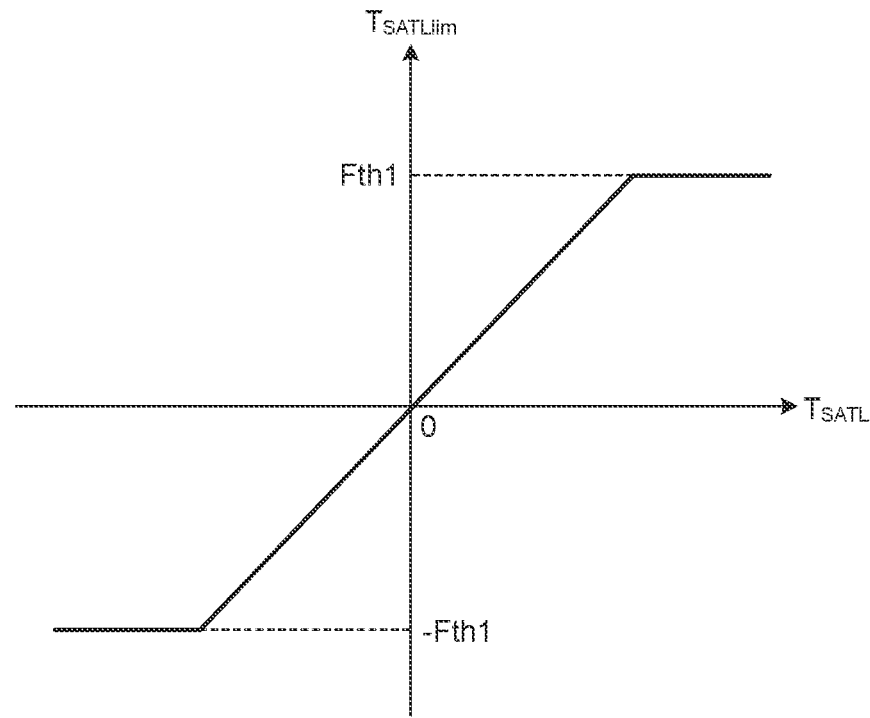
FIG. 19 is a diagram illustrating exemplary setting of the upper and lower limit values of the first band-restricted road surface reaction force at a first limiter.
Figure 20:
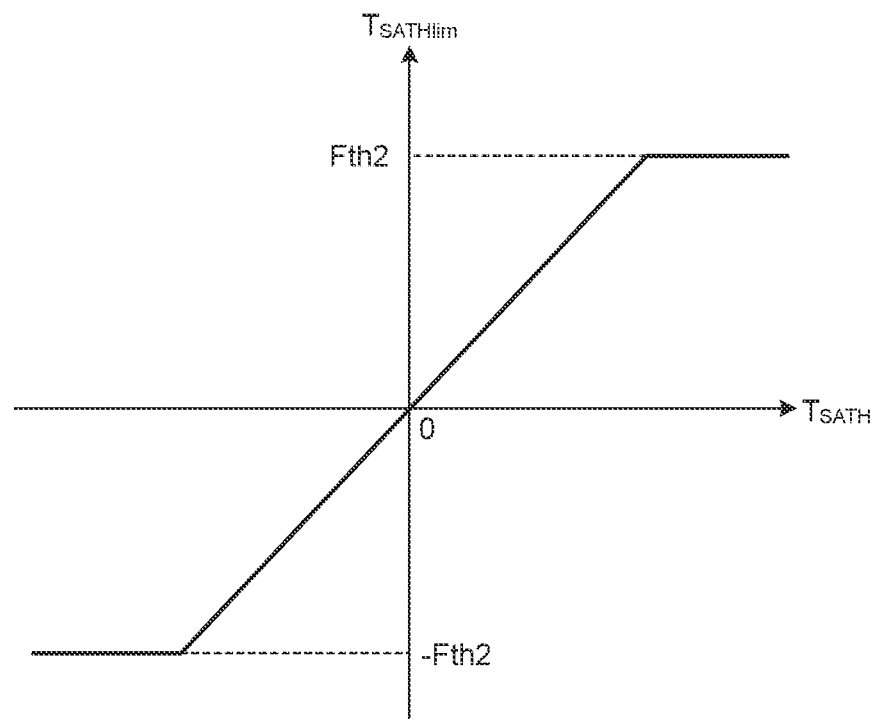
FIG. 20 is a diagram illustrating exemplary setting of the upper and lower limit values of the second band-restricted road surface reaction force at a second limiter.

FIG. 19 is a diagram illustrating exemplary setting of the upper and lower limit values of the first band-restricted road surface reaction force at the first level limiter. FIG. 20 is a diagram illustrating exemplary setting of the upper and lower limit values of the second band-restricted road surface reaction force at the second level limiter.

In the present embodiment, as illustrated in FIG. 19, the first level limiter 431 is a limiter circuit configured to provide level restriction on the first band-restricted road surface reaction force $T_{SATL}$ by a predetermined first upper limit value Fth1 and a predetermined first lower limit value −Fth1. In addition, in the present embodiment, as illustrated in FIG. 20, the second level limiter 432 is a limiter circuit configured to provide level restriction on the second band-restricted road surface reaction force $T_{SATH}$ by a predetermined second upper limit value Fth2 and a predetermined second lower limit value −Fth2. The first upper limit value Fth1, the first lower limit value −Fth1, the second upper limit value Fth2, and the second lower limit value −Fth2 are stored in, for example, the ROM 1002 or the EEPROM 1004 of the control unit 50. The first upper limit value Fth1, the first lower limit value −Fth1, the second upper limit value Fth2, and the second lower limit value −Fth2 may be set as appropriate in accordance with an assumed characteristic of road surface reaction force.

The first band-restricted road surface reaction force $T_{SATL}$ output from the first filter 421 of the band restriction unit 420 is input to the first level limiter 431. The first level limiter 431 calculates first level-restricted road surface reaction force $T_{SATLlim}$ by using, for example, a function indicated in Expression (11) below and outputs the calculated first level-restricted road surface reaction force $T_{SATLlim}$.

If $|T_{SATL}|>|Fth1|$ $$T_{SATLlim}=\text{sign}(T_{SATL})\times|Fth1|$$

Else $$T_{SATLlim}=T_{SATL} \qquad (11)$$

The second band-restricted road surface reaction force $T_{SATH}$ output from the second filter 422 of the band restriction unit 420 is input to the second level limiter 432. The second level limiter 432 calculates second level-restricted road surface reaction force $T_{SATHlim}$ by using, for example, a function indicated in Expression (12) below and outputs the calculated second level-restricted road surface reaction force $T_{SATHlim}$.

If $|T_{SATH}|>|Fth2|$ $$T_{SATHlim}=\text{sign}(T_{SATH})\times|Fth2|$$

Else $$T_{SATHlim}=T_{SATH} \qquad (12)$$

Figure 21:
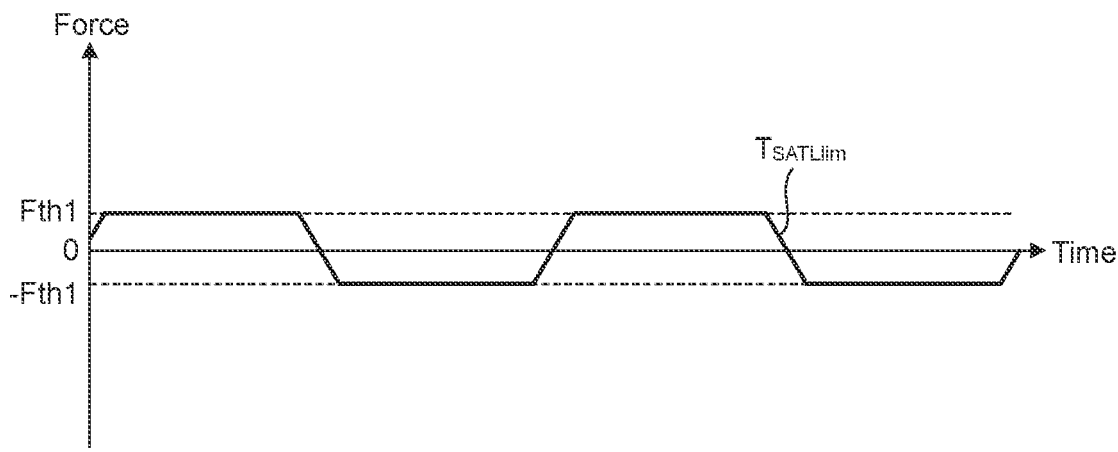
FIG. 21 is a diagram illustrating an example of first level-restricted road surface reaction force that is an output from the first limiter.
Figure 22:
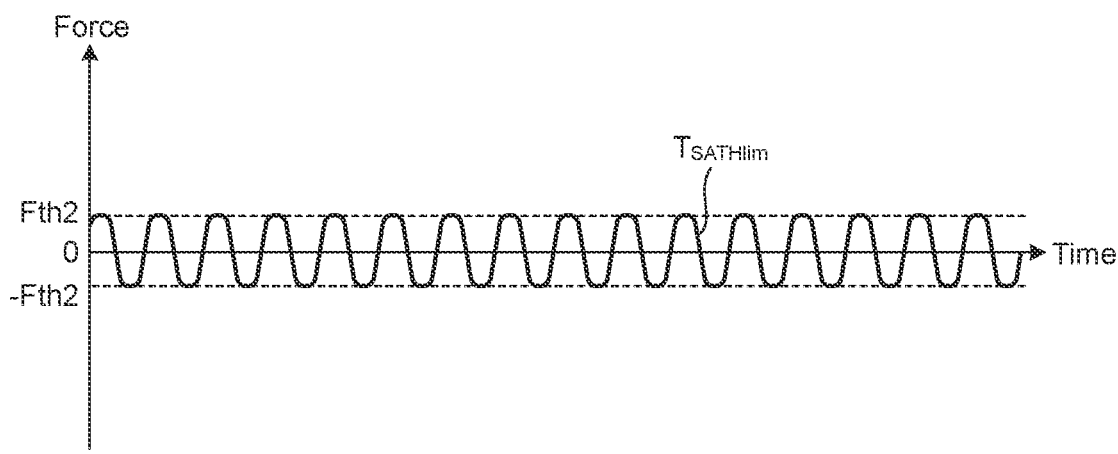
FIG. 22 is a diagram illustrating an example of second level-restricted road surface reaction force that is an output from the second limiter.

FIG. 21 is a diagram illustrating an example of first level-restricted road surface reaction force that is the output from the first level limiter. FIG. 22 is a diagram illustrating an example of second level-restricted road surface reaction force that is the output from the second level limiter. Note that, for simplification of description, FIG. 21 illustrates an example in which the first band-restricted road surface reaction force $T_{SATL}$ illustrated in FIG. 17 is input, and FIG.

22 illustrates an example in which the second band-restricted road surface reaction force $T_{SATH}$ illustrated in FIG. 18 is input.

The first band-restricted road surface reaction force $T_{SATL}$ illustrated in FIG. 17 is level-restricted to the first level-restricted road surface reaction force $T_{SATLlim}$ illustrated in FIG. 21 by the first level limiter 431 and is output. In addition, the second band-restricted road surface reaction force $T_{SATH}$ illustrated in FIG. 18 is level-restricted to the second level-restricted road surface reaction force $T_{SATHlim}$ illustrated in FIG. 22 by the second level limiter 432 and is output.

Note that the magnitude |Fth1| of the first upper limit value Fth1 and the first lower limit value −Fth1 at the first level limiter 431 and the magnitude |Fth2| of the second upper limit value Fth2 and the second lower limit value −Fth2 at the second level limiter 432 may be the same value or mutually different values.

Back in FIG. 11, the correction torque generation unit 440 multiplies, by a predetermined gain, each of the first level-restricted road surface reaction force $T_{SATLlim}$ output from the first level limiter 431 of the level restriction unit 430 and the second level-restricted road surface reaction force $T_{SATHlim}$ output from the second level limiter 432 of the level restriction unit 430, and adds the multiplied first level-restricted road surface reaction force $T_{SATLlim}$ and the multiplied second level-restricted road surface reaction force $T_{SATHlim}$, thereby generating the torque signal Tref_p for obtaining the target steering torque Tref in accordance with the road surface reaction force $T_{SAT}$ estimated as road surface reaction force generated when actual force is physically exerted. Specifically, as illustrated in FIG. 11, the correction torque generation unit 440 includes multiplication units 441 and 442 and an addition unit 443.

The multiplication unit 441 multiplies the first level-restricted road surface reaction force $T_{SATLlim}$ output from the first level limiter 431 of the level restriction unit 430 by a predetermined gain k1.

The multiplication unit 442 multiplies the second level-restricted road surface reaction force $T_{SATHlim}$ output from the second level limiter 432 of the level restriction unit 430 by a predetermined gain k2.

The gains k1 and k2 are coefficients for converting the first level-restricted road surface reaction force $T_{SATLlim}$ and the second level-restricted road surface reaction force $T_{SATHlim}$ into torque values. The gains k1 and k2 are stored in, for example, the ROM 1002 or the EEPROM 1004 of the control unit 50. The gains k1 and k2 may be set as appropriate in accordance with an assumed characteristic of road surface reaction force.

The addition unit 443 generates the torque signal Tref_p by adding a value output from the multiplication unit 441 and a value output from the multiplication unit 442.

As illustrated in FIG. 4, the torque correction value calculation unit 400 outputs the torque signal Tref_p generated by the correction torque generation unit 440 to the target steering torque generation unit 200. As described above, the target steering torque generation unit 200 adds the torque signals Tref_a (first torque signal), Tref_b, and Tref_c and the torque signal Tref_p (second torque signal) calculated by the torque correction value calculation unit 400, and outputs the target steering torque Tref. Accordingly, the target steering torque Tref that follows the road surface reaction force $T_{SAT}$ estimated as road surface reaction force generated when actual force is physically exerted is obtained.

Note that, the gain k1 by which the first level-restricted road surface reaction force $T_{SATLlim}$ is multiplied at the multiplication unit 441 and the gain k2 by which the second level-restricted road surface reaction force $T_{SATHlim}$ is multiplied at the multiplication unit 442 may be the same value or mutually different values.

Figure 23:
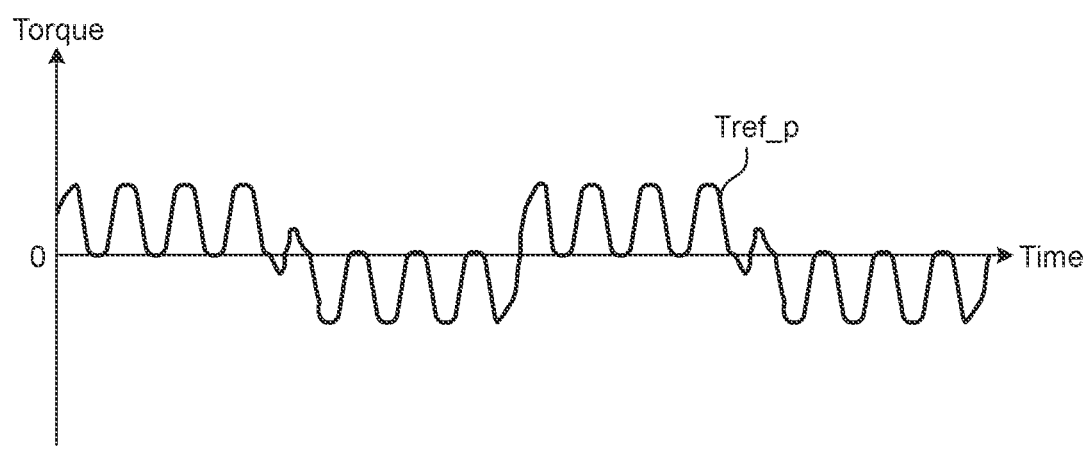
FIG. 23 is a diagram illustrating an exemplary torque signal output from the torque correction value calculation unit according to the embodiment.

FIG. 23 is a diagram illustrating an exemplary torque signal output from the torque correction value calculation unit according to the embodiment. Note that, for simplification of description, FIG. 23 illustrates an example in which the first level-restricted road surface reaction force $T_{SATLlim}$ illustrated in FIG. 21 and the second level-restricted road surface reaction force $T_{SATHlim}$ illustrated in FIG. 22 are input.

Figure 24:
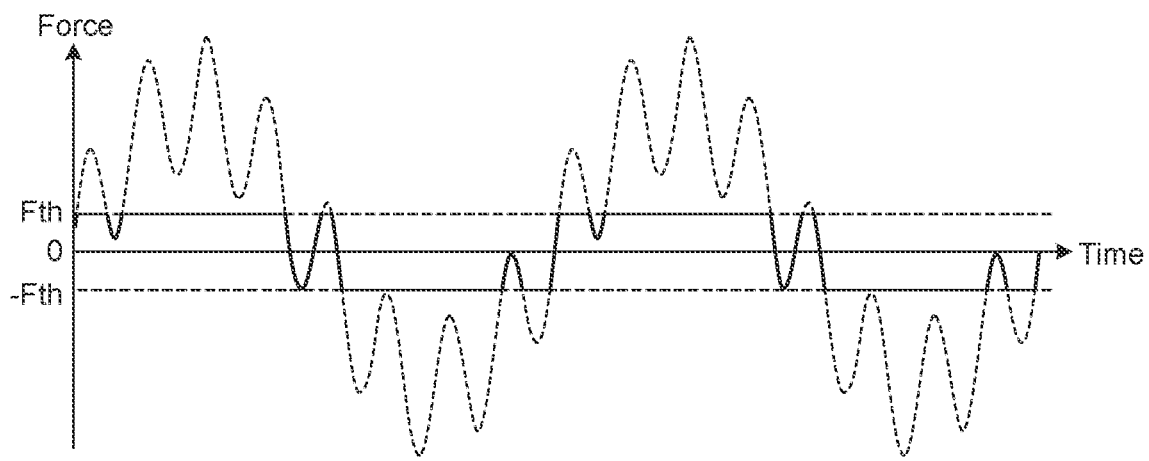
FIG. 24 is a diagram illustrating a comparative example in which road surface reaction force is not band-restricted but is level-restricted.
Figure 25:
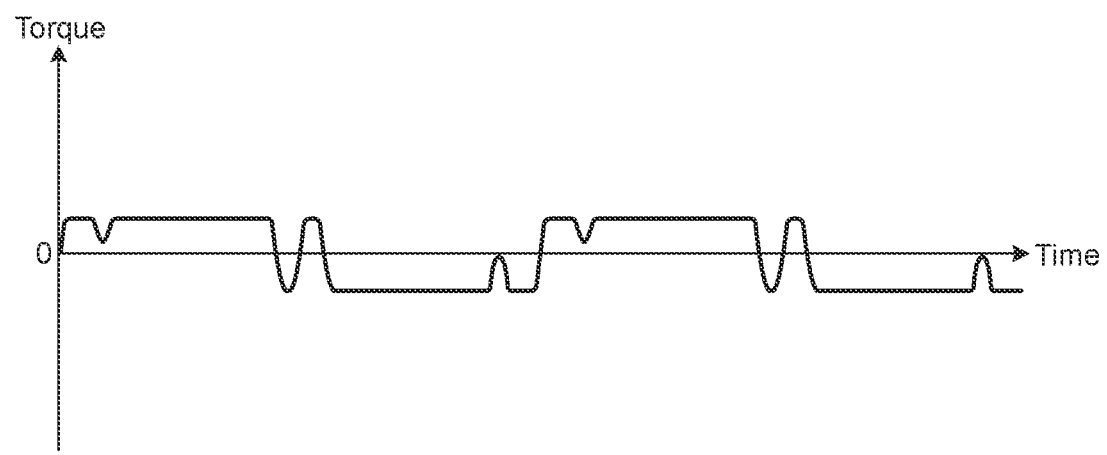
FIG. 25 is a diagram illustrating an exemplary torque signal in the comparative example in which road surface reaction force is not band-restricted but level-restricted.

FIG. 24 is a diagram illustrating a comparative example in which the road surface reaction force is not band-restricted but is level-restricted. FIG. 25 is a diagram illustrating an exemplary torque signal in the comparative example in which the road surface reaction force is not band-restricted but is level-restricted. For simplification of description, FIG. 24 exemplarily illustrates road surface reaction force same as that in FIG. 16.

Characteristics of road surface reaction force generated when actual force is physically exerted as the steering wheels are turned differ depending on the situation of a road surface on which the vehicle travels. Specifically, for example, road surface reaction force having a large amount of low-frequency components is generated in a case of a largely undulating road surface, and road surface reaction force having a large amount of high-frequency components is generated in a case of traveling on a road surface of an unpaved road. In this manner, road surface reaction force received by the steering wheels as actual force is physically exerted have different frequency components in accordance with the situation of a road surface on which the vehicle travels.

As illustrated in, for example, FIG. 24, the high-frequency component superimposed on the low-frequency component is significantly restricted by the upper limit value Fth and the lower limit value −Fth in a configuration in which only whether the absolute value of road surface reaction force exceeds a threshold value is detected irrespective of characteristics of the road surface reaction force and steering reaction force is set to be a constant value for excessive road surface reaction force. Thus, a state in which the high-frequency component of road surface reaction force is not reflected by a generated torque signal may occur as illustrated in, for example, FIG. 25. Accordingly, the following capability of target steering torque for road surface reaction force generated when actual force is physically exerted significantly degrades and no appropriate steering reaction force is obtained in some cases.

In the torque correction value calculation unit 400 according to the present embodiment, the band restriction unit 420 bifurcates the road surface reaction force $T_{SAT}$ estimated by the road surface reaction force estimation unit 410 as road surface reaction force generated when actual force is physically exerted, into the first band-restricted road surface reaction force $T_{SATL}$ and the second band-restricted road surface reaction force $T_{SATH}$ that are restricted to respective different frequency bands. The level restriction unit 430 provides level restriction on each of the first band-restricted road surface reaction force $T_{SATL}$ and the second band-restricted road surface reaction force $T_{SATH}$ output from the band restriction unit 420, by the upper and lower limit values. The correction torque generation unit 440 generates the torque signal Tref_p in accordance with the road surface reaction force $T_{SAT}$ estimated as road surface reaction force generated when actual force is physically exerted, by multiplying each of the first level-restricted road surface reaction force $T_{SATLlim}$ and the second level-restricted road surface reaction force $T_{SATHlim}$ output from the level restriction unit 430 by a predetermined gain and adding the multiplied first level-restricted road surface reaction force $T_{SATLlim}$ and the multiplied second level-restricted road surface reaction force $T_{SATHlim}$.

In other words, the torque correction value calculation unit 400 according to the present embodiment generates the torque signal Tref_p (second torque signal) by separating the road surface reaction force $T_{SAT}$ estimated as road surface reaction force generated when actual force is physically exerted into the low-frequency component (first band-restricted road surface reaction force $T_{SATL}$) and the high-frequency component (second band-restricted road surface reaction force $T_{SATH}$), providing level restriction on each of the low-frequency component (first band-restricted road surface reaction force $T_{SATL}$) and the high-frequency component (second band-restricted road surface reaction force $T_{SATH}$) of the road surface reaction force $T_{SAT}$, and adding torque values converted from the low-frequency component (first level-restricted road surface reaction force $T_{SATLlim}$) and the high-frequency component (second level-restricted road surface reaction force $T_{SATHlim}$) after the level restriction.

With such a configuration, it is possible to obtain the torque signal Tref_p (second torque signal) with which the low-frequency and high-frequency components of the road surface reaction force are each appropriately level-restricted as illustrated in FIG. 23. Accordingly, it is possible to obtain appropriate steering reaction force in accordance with characteristics of the road surface reaction force without degrading the following capability of target steering torque for the road surface reaction force.

Note that, although the embodiment is described above with the example in which the magnitude relation between the cutoff frequency f1 of the first filter 421 and the cutoff frequency f2 of the second filter 422 in the band restriction unit 420 is f1≤f2, more preferably, f1<f2, for example, the magnitude relation between the cutoff frequency f1 of the first filter 421 and the cutoff frequency f2 of the second filter 422 may be f1=f2−f3 when f3 is a significantly small value (for example, f3=(f1)/10 approximately) as compared to the cutoff frequency f1.

Note that, the drawings used in the above description are conceptual diagrams for performing qualitative description of the present disclosure, and the present disclosure is not limited to these drawings. The above-described embodiment is a preferable example of the present disclosure, but not limited thereto, and may be modified in various manners without departing from the scope of the present disclosure.

REFERENCE SIGNS LIST 1 wheel
2 column shaft
3 deceleration mechanism
5 pinion rack mechanism
6a, 6b tie rod
7a, 7b hub unit
8L, 8R steering wheel
10 torque sensor
11 ignition key
12 vehicle speed sensor
13 battery
14 rudder angle sensor
50 control unit (ECU)
60 reaction force device
61 reaction force motor
70 drive device
71 turning motor
72 gear
73 angle sensor
130 current control unit
140 motor current detector
200 target steering torque generation unit
210 basic map unit
211 multiplication unit
213 sign extraction unit
220 differential unit
230 damper gain map unit
240 hysteresis correction unit
260 multiplication unit
261, 262, 263 addition unit
300 twist angle control unit
310 twist angle feedback (FB) compensation unit
320 twist angular velocity calculation unit
330 speed control unit
331 integral unit
332 proportional unit
333, 334 subtraction unit
340 stabilization compensation unit
350 output restriction unit
361 subtraction unit
362 addition unit
400 torque correction value calculation unit
410 road surface reaction force estimation unit
411 conversion unit
412 angular velocity calculation unit
413 angular acceleration calculation unit
414, 415, 416, 417 block
418, 419 subtraction unit
420 band restriction unit
421 first filter
422 second filter
430 level restriction unit
431 first level limiter
432 second level limiter
440 correction torque generation unit
441, 442 multiplication unit
443 addition unit
500 conversion unit
910 target turning angle generation unit
920 turning angle control unit
921 turning angle feedback (FB) compensation unit
922 turning angular velocity calculation unit
923 speed control unit
926 output restriction unit
927 subtraction unit
930 current control unit
931 restriction unit
932 rate restriction unit
933 correction unit
940 motor current detector
1001 CPU
1002 ROM
1003 RAM
1004 EEPROM
1005 interface
1006 A/D converter
1007 PWM controller
1100 control computer (MCU)

The invention claimed is:

1. A vehicle steering device comprising:
a reaction force motor configured to apply steering reaction force to a wheel;
a turning motor configured to turn a tire in accordance with steering of the wheel; and
a control unit configured to control the reaction force motor and the turning motor, wherein
the control unit includes
a target steering torque generation unit configured to generate a first torque signal based on a predetermined basic map in accordance with at least a vehicle speed and a steering angle of a vehicle and generate target steering torque for the reaction force motor, and
a torque correction value calculation unit configured to generate a second torque signal in accordance with road surface reaction force acting on a steering wheel of the vehicle,
the torque correction value calculation unit generates the second torque signal by separating estimated road surface reaction force into a low-frequency component and a high-frequency component, providing level restriction on each of the low-frequency component and the high-frequency component, and adding torque values converted from the low-frequency component and the high-frequency component after the level restriction, and
the target steering torque generation unit generates the target steering torque by adding at least the first torque signal and the second torque signal.

2. The vehicle steering device according to claim 1, wherein the torque correction value calculation unit includes
a road surface reaction force estimation unit configured to calculate the estimated road surface reaction force based on a current value of the turning motor and a turning angle of the steering wheel,
a band restriction unit configured to bifurcate the estimated road surface reaction force into first band-restricted road surface reaction force and second band-restricted road surface reaction force restricted to respective different frequency bands,
a level restriction unit configured to provide level restriction on each of the first band-restricted road surface reaction force and the second band-restricted road surface reaction force by an upper limit value and a lower limit value, and
a correction torque generation unit configured to generate the second torque signal by multiplying each of first level-restricted road surface reaction force and second level-restricted road surface reaction force by a predetermined gain and adding the multiplied first level-restricted road surface reaction force and the multiplied second level-restricted road surface reaction force, the first level-restricted road surface reaction force being obtained through level restriction on the first band-restricted road surface reaction force, the second level-restricted road surface reaction force being obtained through level restriction on the second band-restricted road surface reaction force.

3. The vehicle steering device according to claim 2, wherein
the band restriction unit includes a first filter and a second filter having respective different passbands,
the first filter is a low-pass filter having a passband equal to a first frequency band including the low-frequency component of the estimated road surface reaction force, and outputs the low-frequency component of the road surface reaction force as the first band-restricted road surface reaction force, and
the second filter is a high-pass filter having a passband equal to a second frequency band including the high-frequency component of the estimated road surface reaction force, and outputs the high-frequency component of the road surface reaction force as the second band-restricted road surface reaction force.

* * * * *